(12) United States Patent
Schmilovitch et al.

(10) Patent No.: US 9,392,816 B2
(45) Date of Patent: *Jul. 19, 2016

(54) APPARATUS AND METHOD FOR EXTRACTING POMEGRANATE SEEDS FROM POMEGRANATES

(71) Applicant: STATE OF ISRAEL, MINISTRY OF AGRICULTURE AND RURAL DEVELOPMENT AGRICULTURAL RESEARCH ORGANIZATIO, VOLCANI CENTER, Beit Dagan (IL)

(72) Inventors: Ze'ev Schmilovitch, Yehud (IL); Yoav Sarig, Ra'anana (IL); Avraham Daskal, Holon (IL); Eitan Weinberg, Ein Ganim (IL); Friedrich Grosz, Holon (IL); Benjamin Ronen, Ra'anana (IL); Aharon Hoffman, Ramat Gan (IL); Haim Egozi, Hod Hasharon (IL)

(73) Assignee: STATE OF ISRAEL, MINISTRY OF AGRICULTURE AND RURAL DEVELOPMENT AGRICUL, Beit Dagan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,453

(22) Filed: Apr. 30, 2014

(65) Prior Publication Data
US 2015/0082998 A1   Mar. 26, 2015

Related U.S. Application Data

(63) Continuation of application No. 13/586,034, filed on Aug. 15, 2012, now Pat. No. 8,734,883, which is a continuation of application No. 13/014,307, filed on Jan. 26, 2011, now Pat. No. 8,247,011, which is a continuation of application No. 10/545,709, filed as application No. PCT/IL2004/000135 on Feb. 11, 2004, now Pat. No. 7,968,136.

(30) Foreign Application Priority Data

Feb. 11, 2003   (IL) .......................................... 154398

(51) Int. Cl.
A23L 1/00    (2006.01)
A23N 4/24    (2006.01)
A23N 4/12    (2006.01)

(52) U.S. Cl.
CPC ... *A23N 4/24* (2013.01); *A23N 4/12* (2013.01)

(58) Field of Classification Search
USPC ............. 99/538–547, 584–590; 426/484, 481
See application file for complete search history.

(56) References Cited

U.S. PATENT DOCUMENTS 1,982,742  A      12/1934  Keenan
4,002,774  A       1/1977  Chan
4,122,765  A  *   10/1978  Silvestrini ....................... 99/551

(Continued)

FOREIGN PATENT DOCUMENTS

WO           0060957 A1    10/2000

*Primary Examiner* — Brian Jennison
(74) *Attorney, Agent, or Firm* — Fish & Richardson P.C.

(57) ABSTRACT

Apparatus for extracting pomegranate seeds from pomegranates including a pomegranate breaker operative for breaking open pomegranates generally without cutting pomegranate seeds at the interior of the pomegranates and a pomegranate seed extractor operative to engage broken open pomegranates for separating the pomegranate seeds from other parts of the pomegranates.

9 Claims, 33 Drawing Sheets

(56) References Cited

U.S. PATENT DOCUMENTS

| | | |
|---|---|---|
| 4,284,651 A | 8/1981 | Bruemmer |
| 4,300,448 A | 11/1981 | Hayashi |
| 4,530,278 A | 7/1985 | Sarig |
| 4,861,464 A | 8/1989 | Zaltzman |
| 5,000,967 A | 3/1991 | Adams |
| 5,088,393 A * | 2/1992 | Nahir et al. .................. 99/516 |
| 5,178,057 A | 1/1993 | Nahir |
| 5,286,508 A | 2/1994 | Nahir |
| 5,508,052 A | 4/1996 | Lin |
| 5,660,104 A | 8/1997 | Heinzen |
| 5,817,360 A | 10/1998 | Pao |
| 6,220,153 B1 | 4/2001 | Easby |
| 6,371,014 B1 | 4/2002 | Ismail |
| 7,236,237 B2 | 6/2007 | Schmilovitch |

* cited by examiner

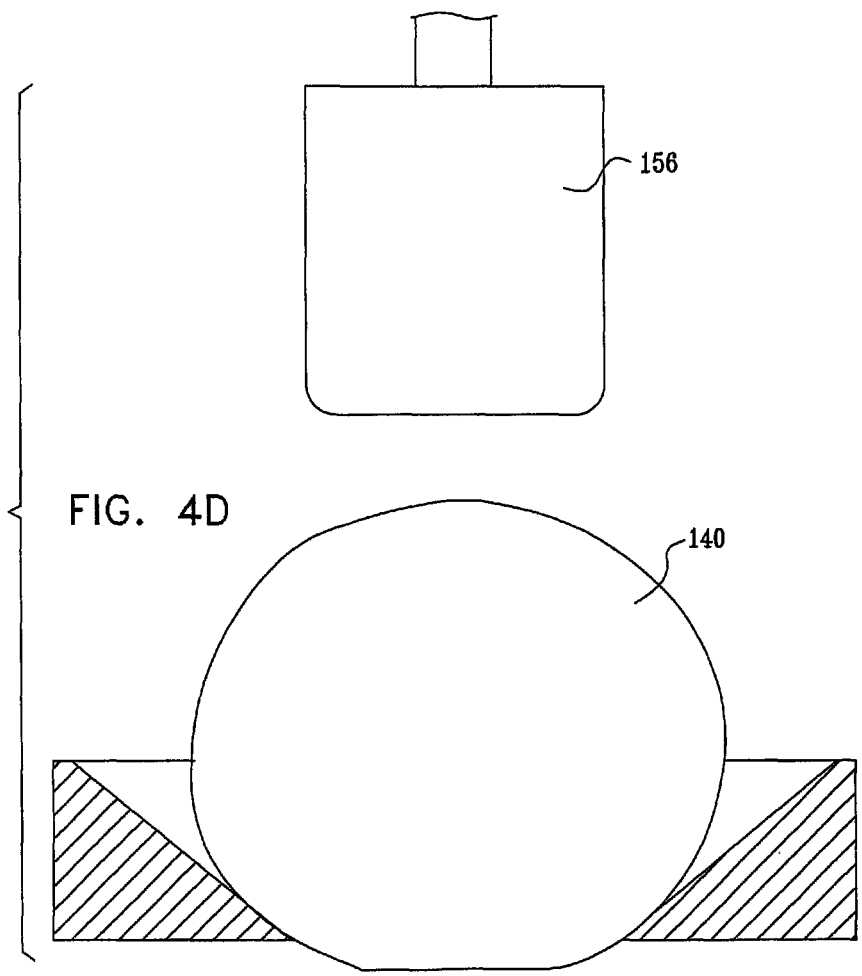

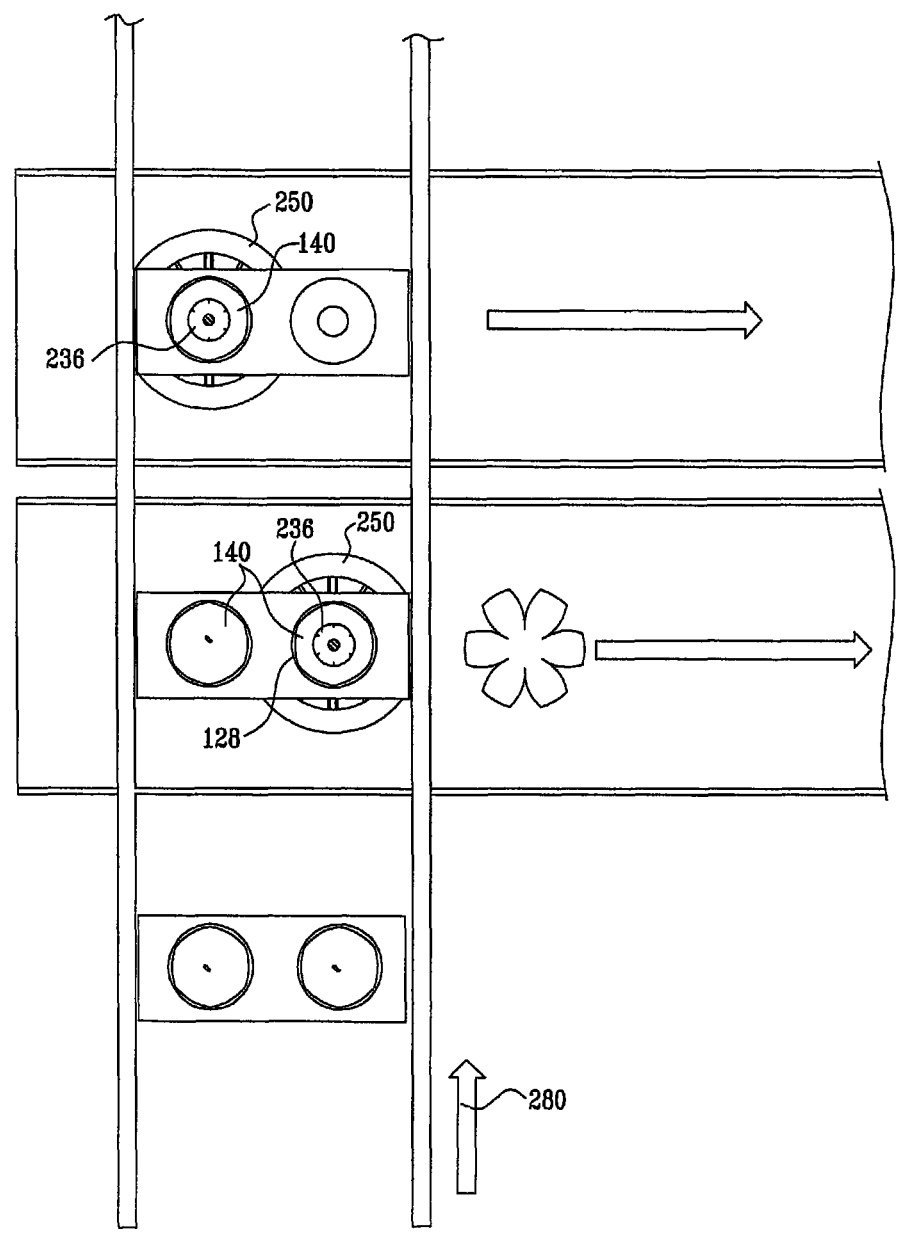

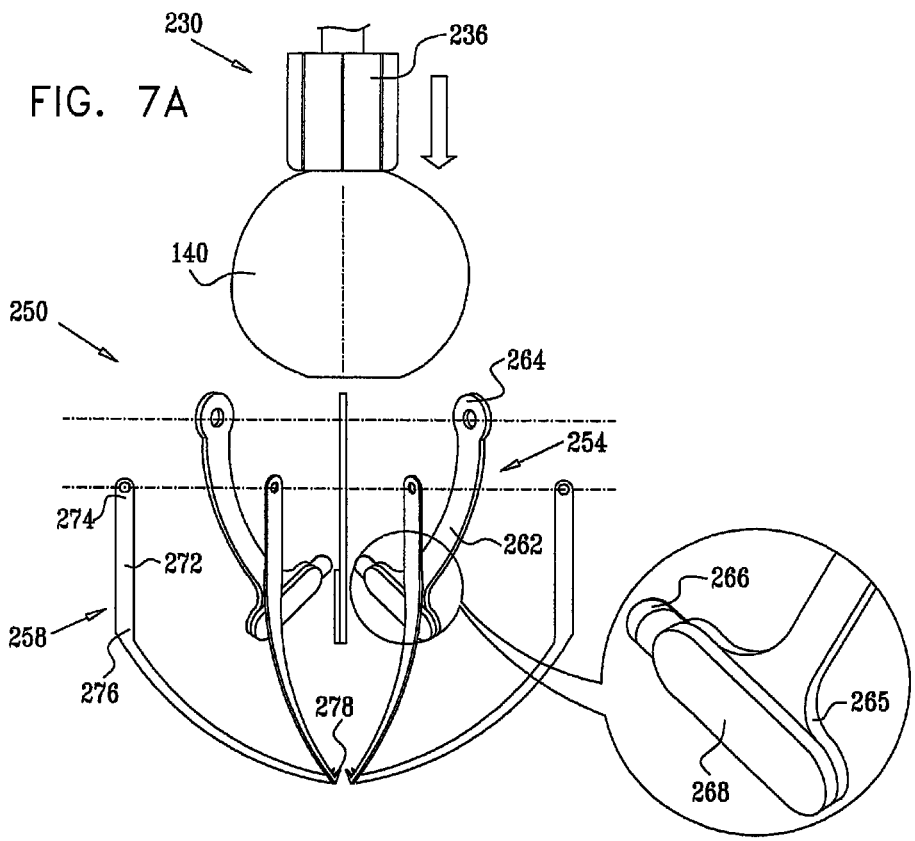
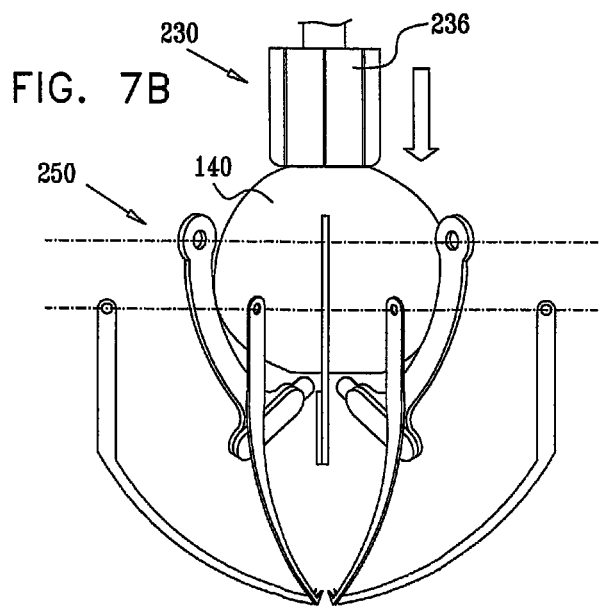

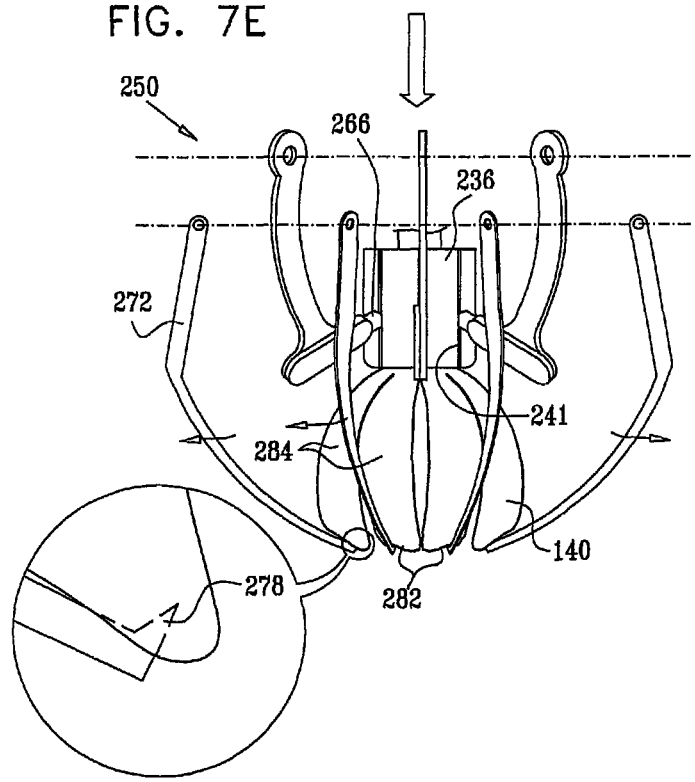
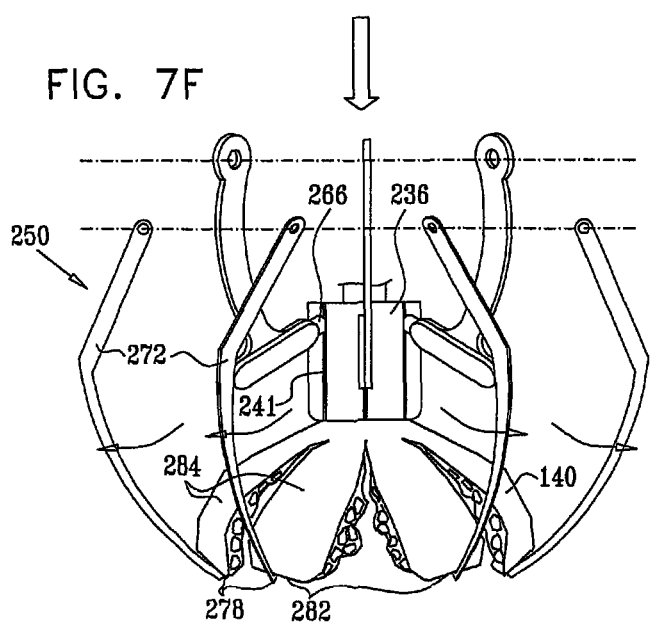

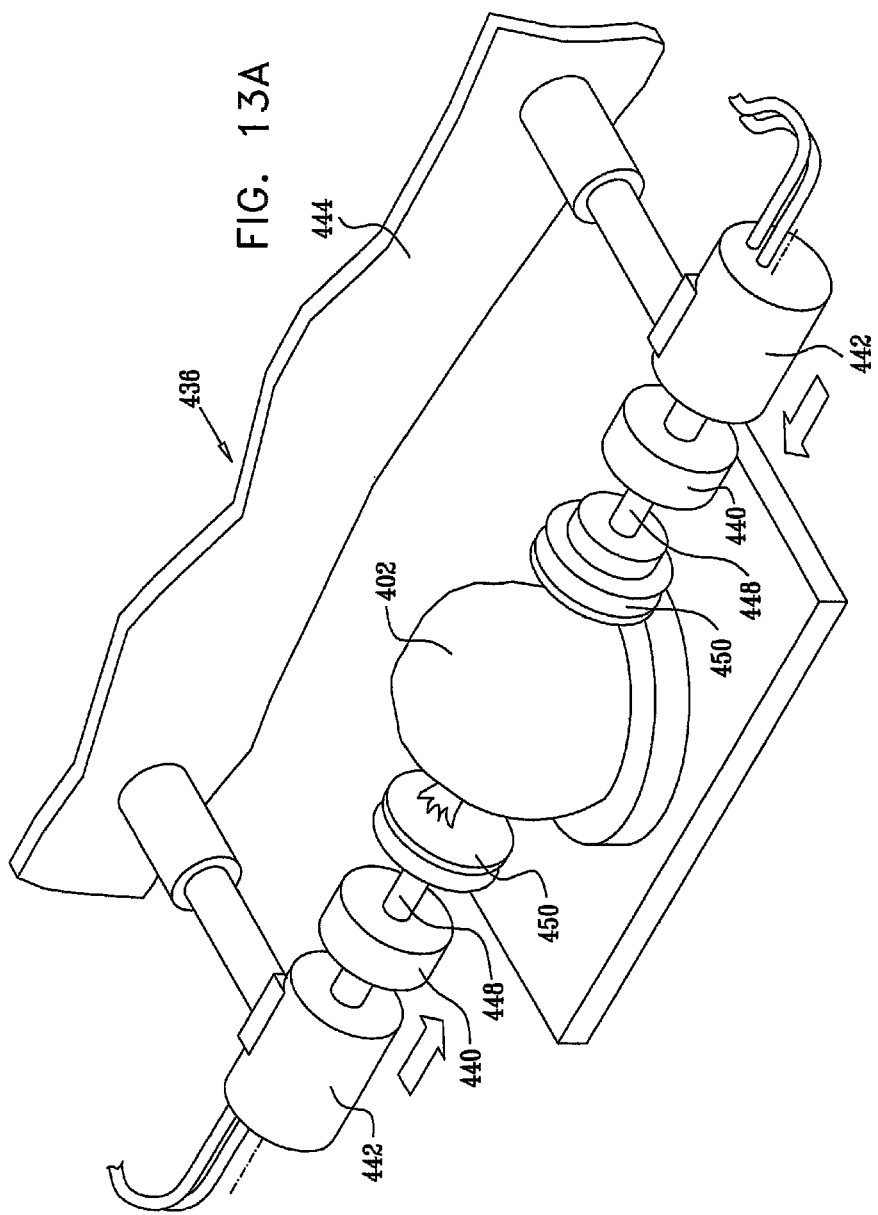

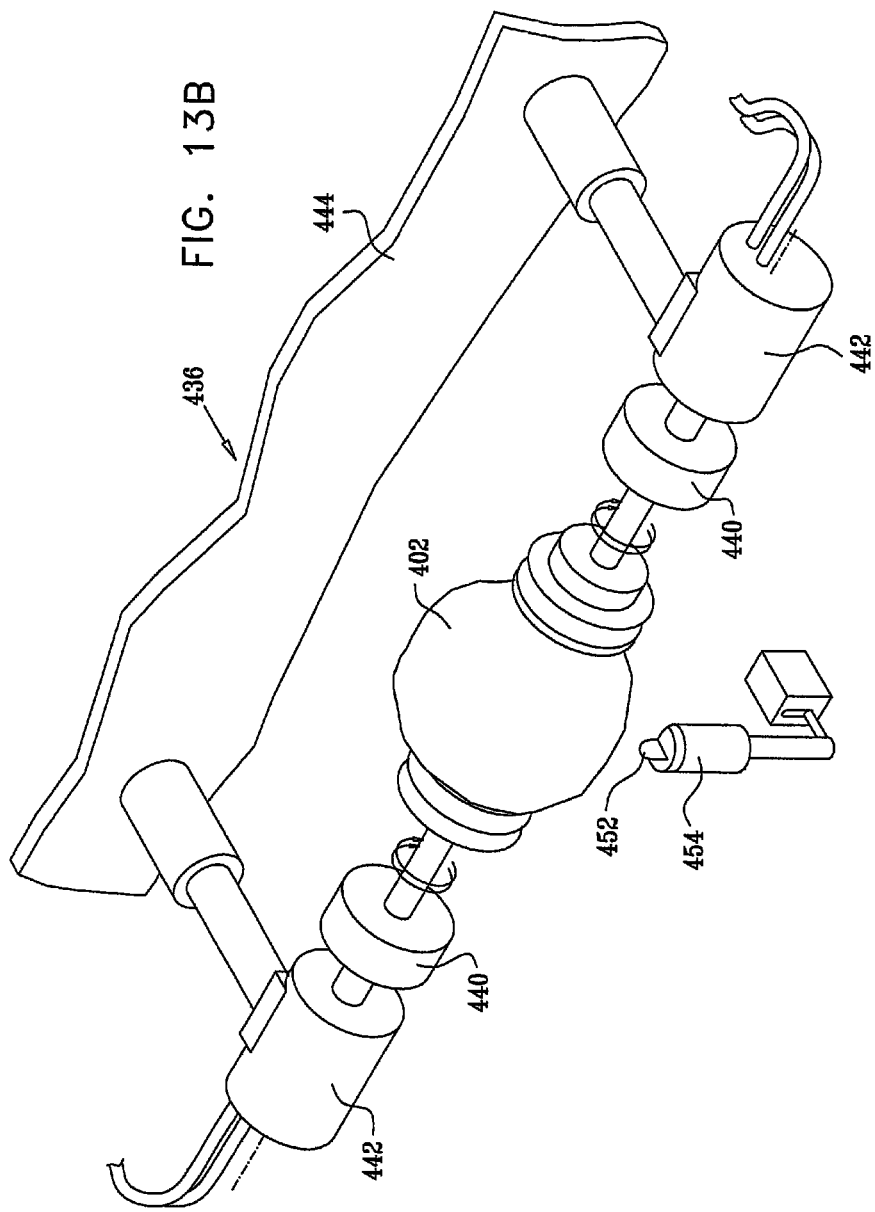

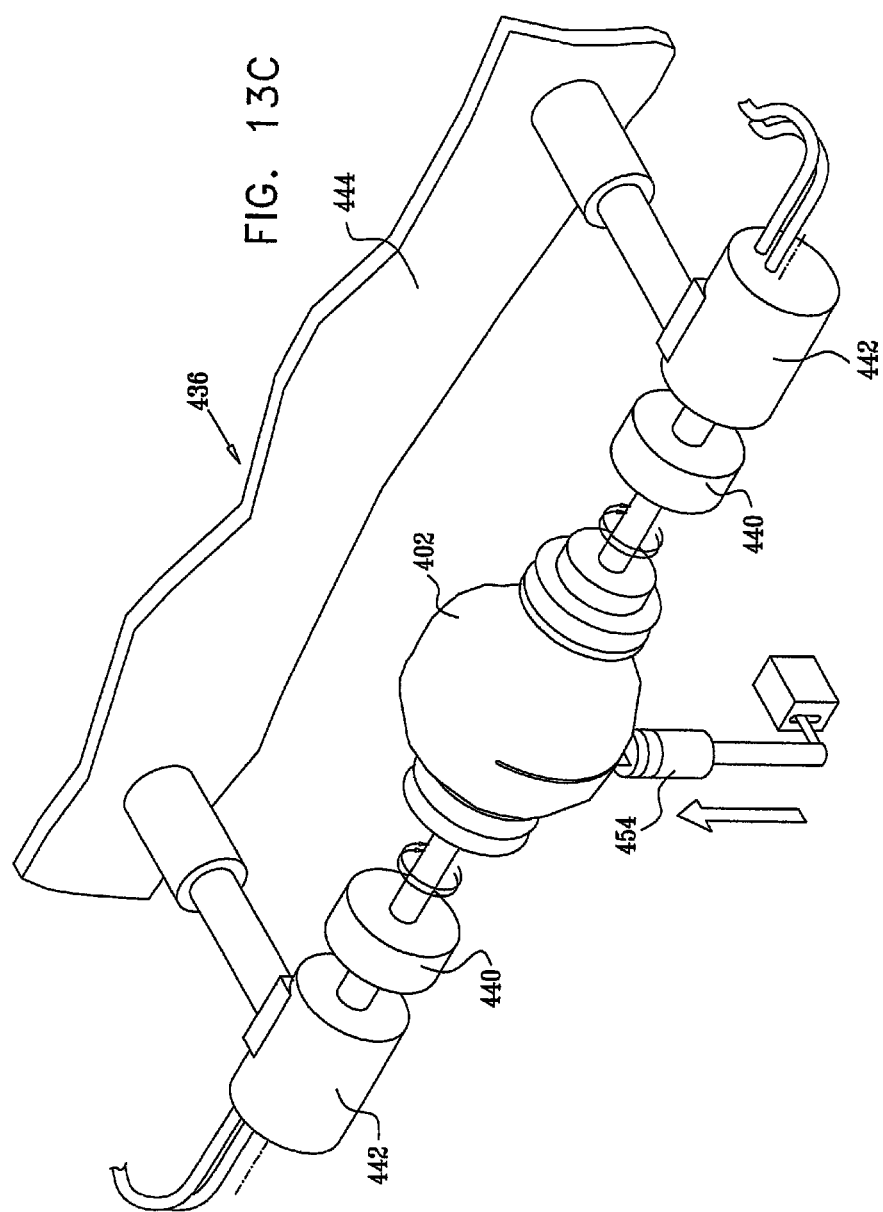

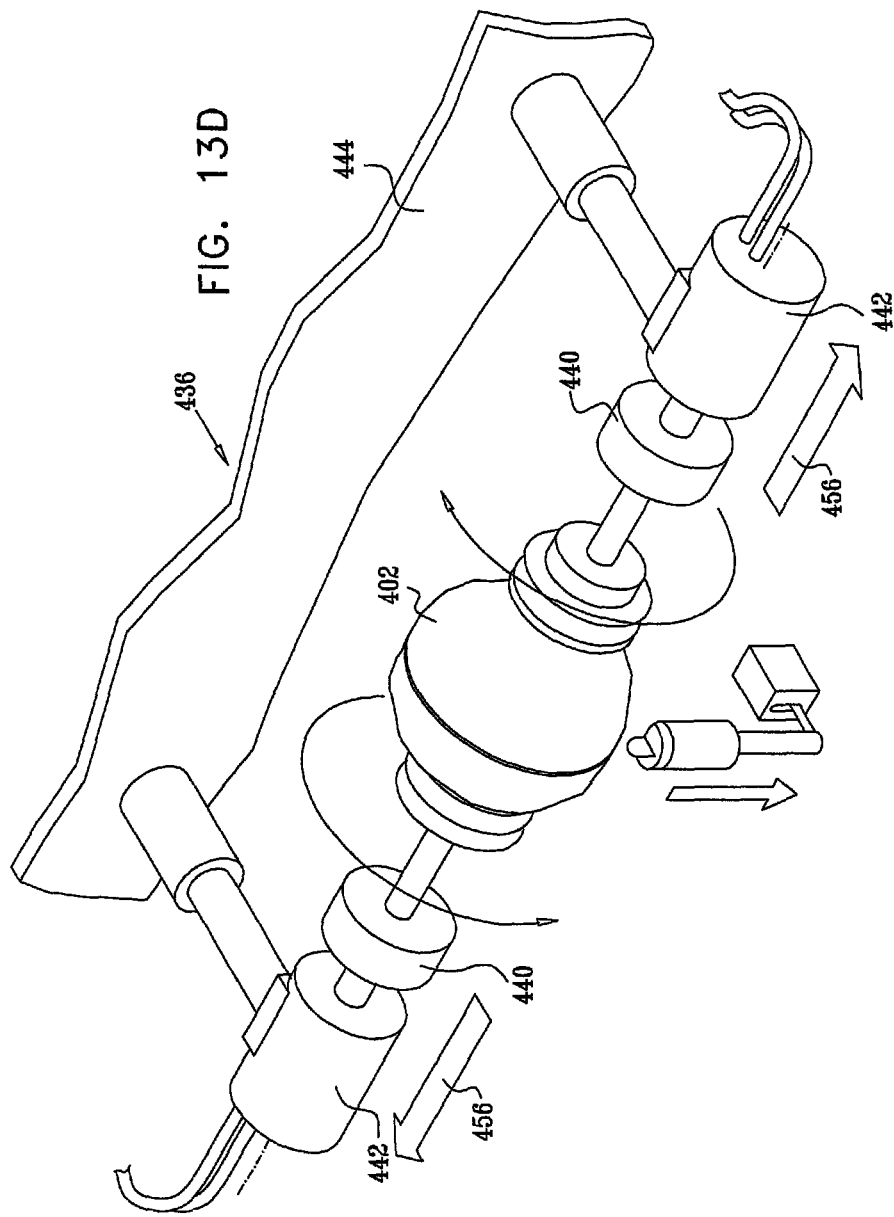

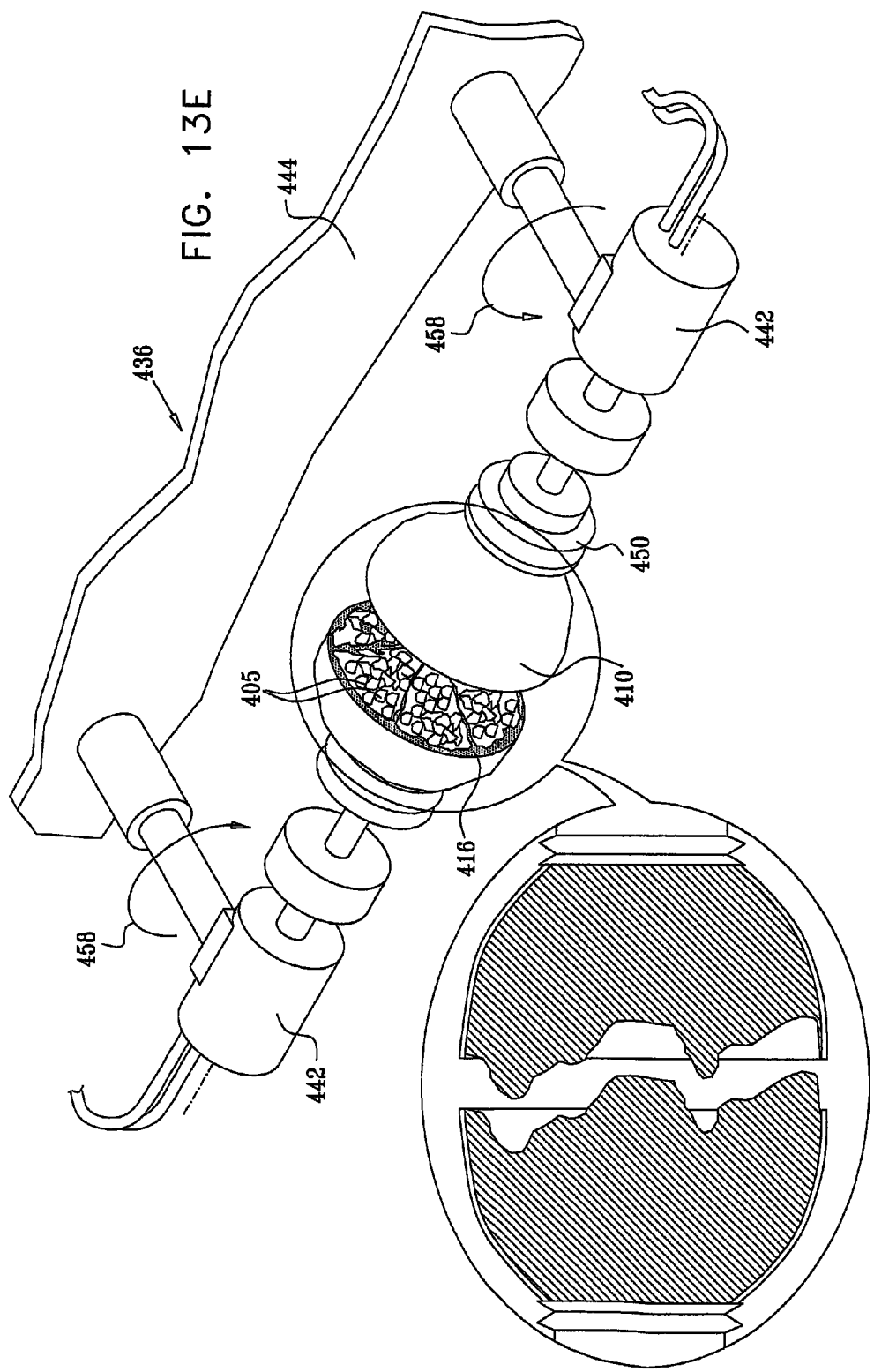

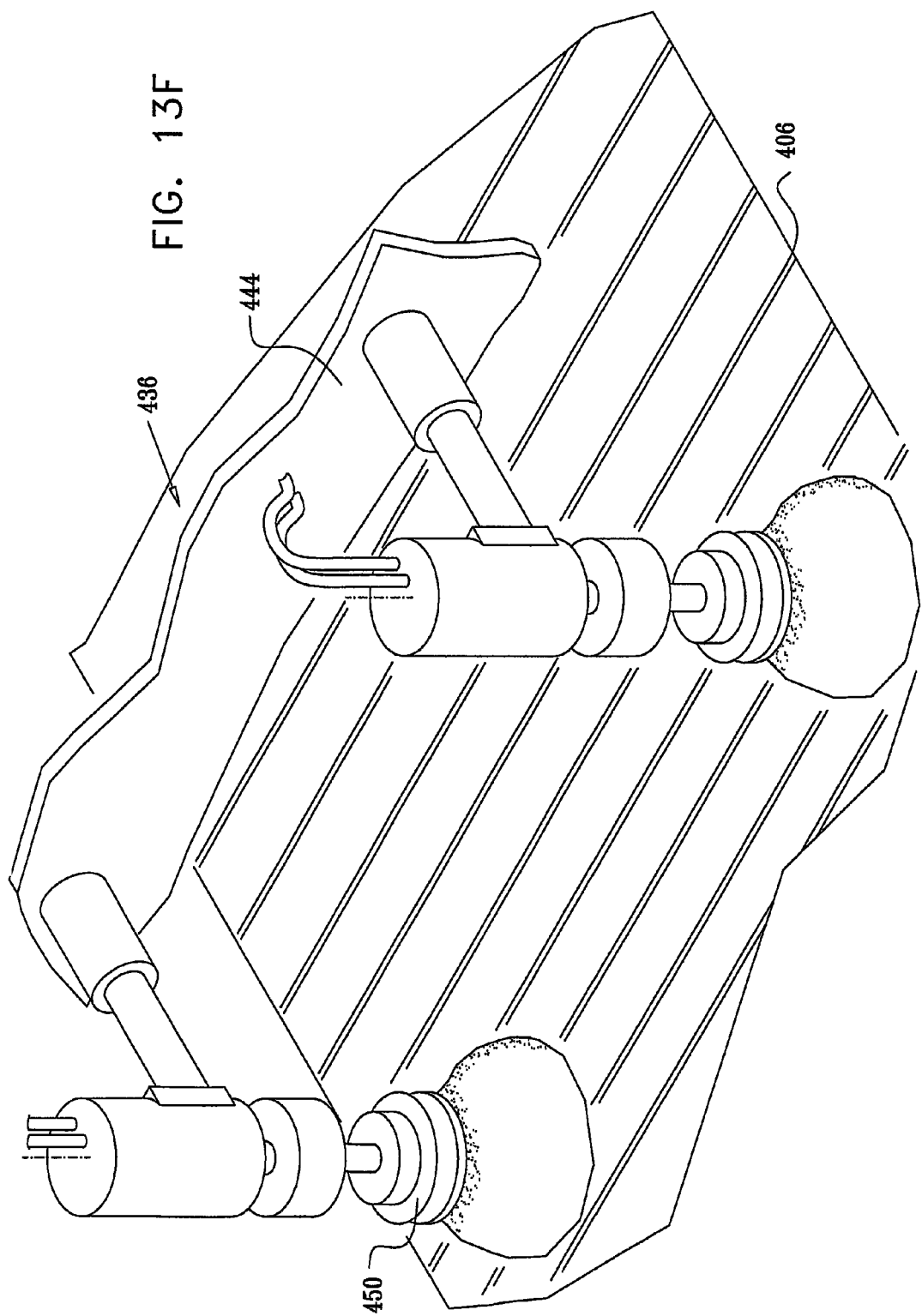

APPARATUS AND METHOD FOR EXTRACTING POMEGRANATE SEEDS FROM POMEGRANATES

REFERENCE TO CO-PENDING APPLICATIONS

This application is a continuation of U.S. patent application Ser. No. 13/586,034, filed Aug. 15, 2012, entitled "APPARATUS AND METHOD FOR EXTRACTING POMEGRANATE SEEDS FROM POMEGRANATES", now U.S. Pat. No. 8,734,883, which is a continuation of U.S. patent application Ser. No. 13/014,307, filed Jan. 26, 2011, entitled "APPARATUS AND METHOD FOR EXTRACTING POMEGRANATE SEEDS FROM POMEGRANATES", now U.S. Pat. No. 8,247,011, which is a continuation of U.S. patent application Ser. No. 10/545,709, filed Jul. 19, 2007, entitled "APPARATUS AND METHOD FOR EXTRACTING POMEGRANATE SEEDS FROM POMEGRANATES", now U.S. Pat. No. 7,968,136, which is a U.S. National Phase Application of PCT Application No. PCT/IL2004/000135, filed Feb. 11, 2004, the contents of all of which are incorporated by reference.

FIELD OF THE INVENTION

The present invention relates to the processing of fresh pomegranates generally and more particularly to the extraction of the seeds of pomegranates for fresh consumption.

BACKGROUND OF THE INVENTION

The following U.S. Patents are believed to represent the current state of the art:

U.S. Pat. Nos. 5,508,052; 5,000,967; 4,284,651; 4,530,278; 5,178,057; 5,088,393; 5,286,508; 5,817,360; 6,220,153 and 6,371,014.

SUMMARY OF THE INVENTION

The present invention seeks to provide apparatus and methodology for the efficient extraction of the seeds of pomegranates.

There is thus provided in accordance with a preferred embodiment of the present invention apparatus for extracting pomegranate seeds from pomegranates including a pomegranate breaker operative for breaking open pomegranates generally without cutting pomegranate seeds at the interior of the pomegranates and a pomegranate seed extractor operative to engage broken open pomegranates for separating the pomegranate seeds from other parts of the pomegranates.

In accordance with a preferred embodiment of the present invention the pomegranate breaker includes a pomegranate periphery scorer for scoring an outside rind of the pomegranates. Additionally or alternatively, the pomegranate breaker includes a pomegranate crown remover. Additionally, the crown remover includes a rotating knife having a curved cutting edge configured to enable removal of the crown generally without cutting pomegranate seeds. In accordance with another preferred embodiment of the present invention the pomegranate breaker includes a plurality of hooks which engage segments of the pomegranates following partial separation of the segments from each other by scoring.

In accordance with yet another preferred embodiment of the present invention the pomegranate breaker includes an equatorial scorer for performing equatorial scoring of the pomegranate. In accordance with still another preferred embodiment of the present invention the pomegranate breaker includes a pomegranate engager for oppositely rotating portions of the pomegranate, thereby to break open the pomegranate. In accordance with a further preferred embodiment of the present invention the pomegranate breaker includes an automatic pomegranate positioning assembly operative automatically to position the pomegranate at multiple operative positions during pomegranate breaking. Additionally or alternatively, the pomegranate breaker includes a scoring knife having a cutting depth limiter associated therewith.

In accordance with still another preferred embodiment of the present invention the pomegranate seed extractor includes a plurality of fluid jets. Additionally, the fluid jets impinge upon the broken-open pomegranates while the broken-open pomegranates are in motion. In accordance with another preferred embodiment of the present invention the pomegranate seed extractor includes a pomegranate seed/pomegranate membrane separator.

There is also provided in accordance with another preferred embodiment of the present invention a method for extracting pomegranate seeds from pomegranates including automatically breaking open pomegranates generally without cutting pomegranate seeds at the interior of the pomegranates and engaging broken-open pomegranates for separating the pomegranate seeds from other parts of the pomegranates.

In accordance with another preferred embodiment of the present invention the breaking includes scoring an outside rind of the pomegranates. Additionally or alternatively, the breaking includes pomegranate crown removal. In accordance with yet another preferred embodiment of the present invention the breaking includes automatically causing a plurality of hooks to engage segments of the pomegranates following partial separation of the segments from each other by scoring. In accordance with still another preferred embodiment of the present invention the breaking includes performing equatorial scoring of the pomegranate. In accordance with yet another preferred embodiment of the present invention the breaking includes oppositely rotating portions of the pomegranate, thereby to break open the pomegranate. Additionally or alternatively, the breaking includes automatically positioning the pomegranate at multiple operative positions during pomegranate breaking.

In accordance with another preferred embodiment of the present invention the breaking employs a scoring knife having a cutting depth limiter associated therewith.

In accordance with yet another preferred embodiment of the present invention the engaging employs a plurality of fluid jets. Additionally, the engaging comprises moving the broken-open pomegranates while the fluid jets impinge upon the broken-open pomegranates. In accordance with still another preferred embodiment of the present invention the engaging comprises separating the pomegranate seeds from pomegranate membranes.

BRIEF DESCRIPTION OF THE DRAWINGS

The present invention will be understood and appreciated more fully from the following detailed description, taken in conjunction with the drawings in which:

FIGS. 4A, 4B, 4C and 4D are simplified side view illustrations of four steps in the operation of the apparatus of FIG. 3;

FIGS. 6A, 6B, 6C, 6D, 6E, 6F, 6G, 6H and 6I are simplified top view illustrations of steps in the operation of the pomegranate break-open assembly of FIGS. 1 and 5;

FIGS. 7A, 7B, 7C, 7D, 7E, 7F, 7G, 7H and 7I are simplified side view illustrations of steps in the operation of the pomegranate break-open assembly of FIGS. 1 and 5;

FIGS. 13A-13F are simplified pictorial illustrations which illustrate breaking open a pomegranate using the apparatus of FIG. 12.

DETAILED DESCRIPTION OF PREFERRED EMBODIMENTS

Figure 1:
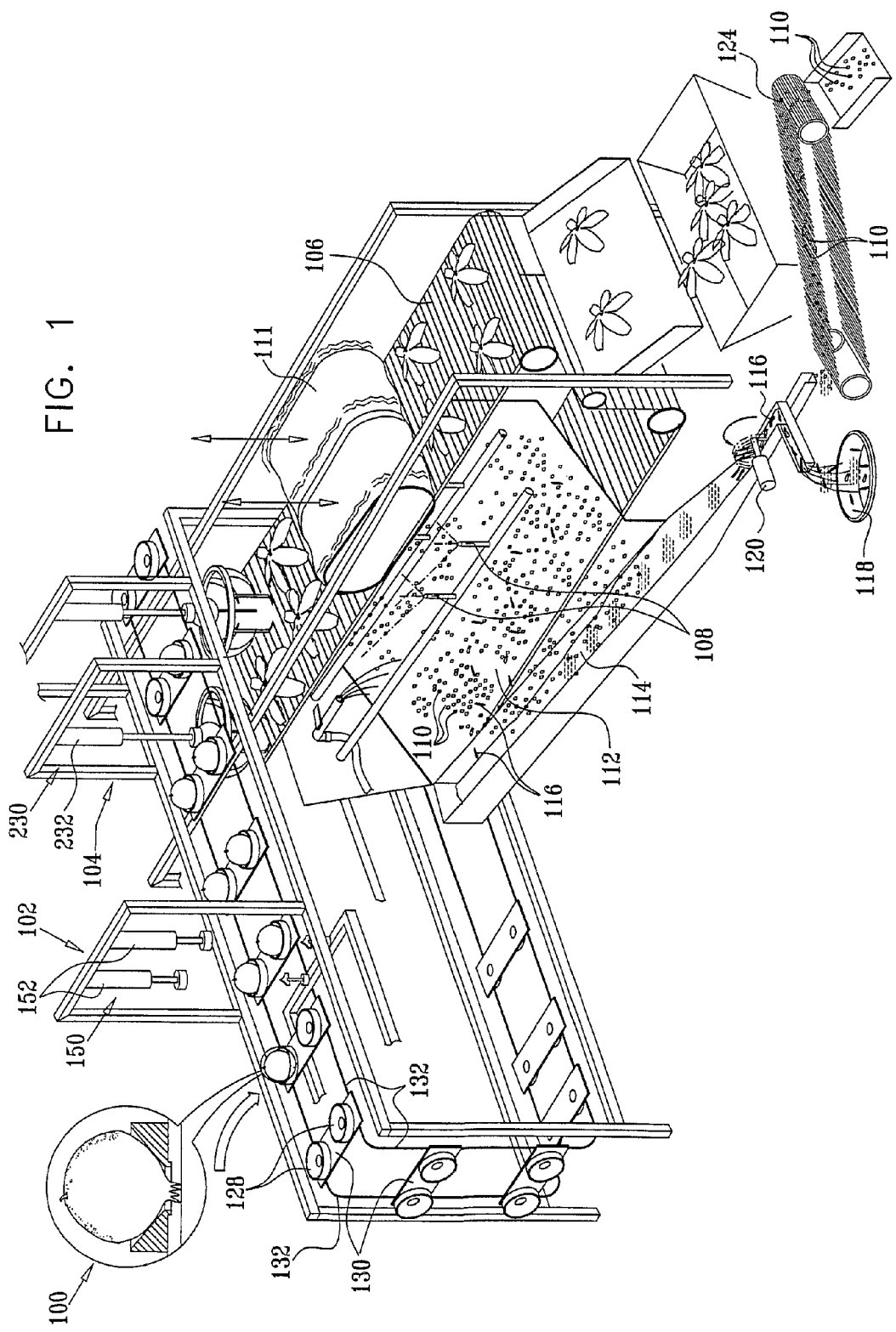
FIG. 1 is a simplified pictorial illustration of apparatus for extraction of seeds of pomegranates, constructed and operative in accordance with a preferred embodiment of the present invention.

Reference is now made to FIG. 1, which is a simplified pictorial illustration of apparatus for extraction of seeds of pomegranates, constructed and operative in accordance with a preferred embodiment of the present invention. For the purposes of the specification and claims, the term "seed" is employed to refer to the individual seed enveloped by its aril.

The apparatus of FIG. 1 comprises an endless conveyor 100, driven by a motor (not shown) preferably in a stepwise manner, which is operative to receive and supply pomegranates to crown removal assemblies 102 and thereafter to pomegranate break-open assemblies 104, which break open the pomegranates to expose their seeds for extraction thereof, generally without cutting the seeds. Broken-open pomegranates are transported on conveyors 106, preferably rod, mesh or screen conveyors, into operative engagement with fluid jets, preferably air jets 108, which dislodge the seeds 110 from the remainder of the broken-open pomegranate. Preferably a retaining conveyor belt 111, which is preferably vibrating, engages the broken-open pomegranates from above, while they are engaged by the air jets 108 from below. The dislodged seeds 110 are preferably engaged by a flow of water and caused thereby to fall along an inclined surface 112 into a water flow trough 114 at which pomegranate membranes 116 are separated therefrom, by floating. The membranes 116 are deflected to a waste receptacle 118, some of the membranes being deflected by a rotating membrane deflector 120. The seeds 110 are preferably conveyed by an additional conveyor 124, preferably a screen conveyor, which permits water to drip therethrough, to a collection location (not shown).

Conveyor 100 preferably comprises pairs of pomegranate support sockets 128, which are mounted in pairs onto socket support surfaces 130. Socket support surfaces 130 are preferably interconnected by chains 132, as shown.

Figure 2A:
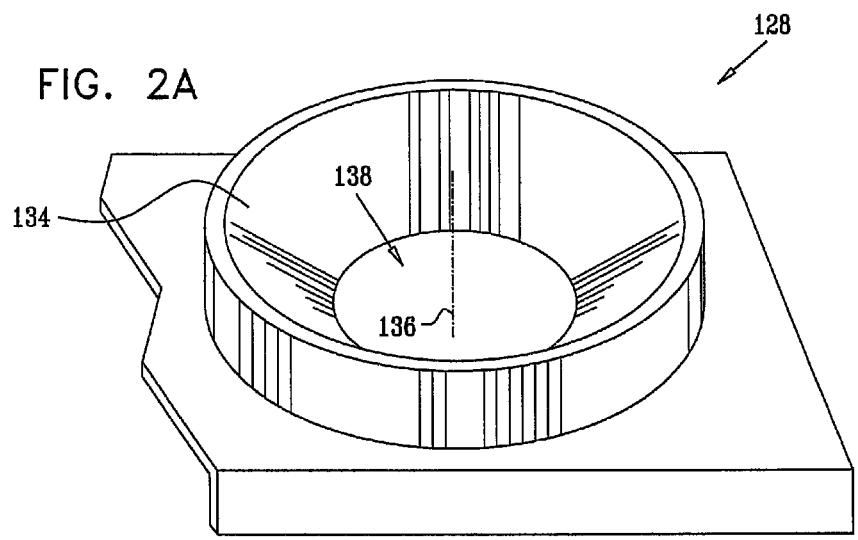
FIGS. 2A & 2B are simplified pictorial illustrations of a pomegranate holder forming part of the apparatus of FIG. 1, both empty and holding a pomegranate in an orientation suitable for operation of the apparatus of FIG. 1.
Figure 2B:
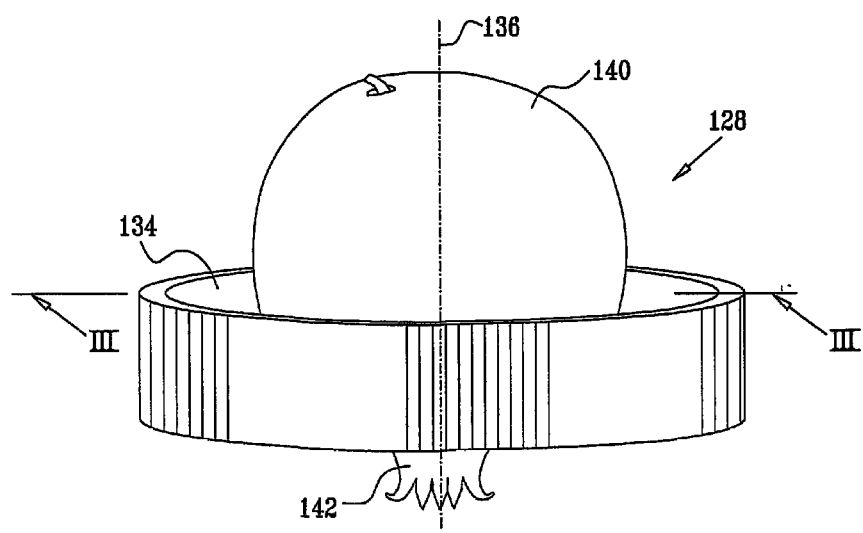

Reference is made to FIGS. 2A and 2B, which illustrate a pomegranate support socket 128, both empty and holding a pomegranate in an orientation suitable for operation of the apparatus of FIG. 1. As seen in FIGS. 2A and 2B, pomegranate support socket 128 preferably defines a generally conical circumferential pomegranate support surface 134 which is rotationally symmetric about a generally vertical axis, designated by reference numeral 136. An aperture 138 is defined at the center of pomegranate support surface 134 through which the lower part of the pomegranate, including the crown, extends.

Preferably, the pomegranate support surface 134 is arranged at an angle of approximately 33 degrees with respect to a horizontal plane orthogonal to vertical axis 136 and the aperture 138 has a radius of 30 mm. Preferably, as seen in FIG. 2B, each pomegranate 140 is arranged in a pomegranate support socket 128, such that its crown 142 is centered along axis 136.

Figure 3:
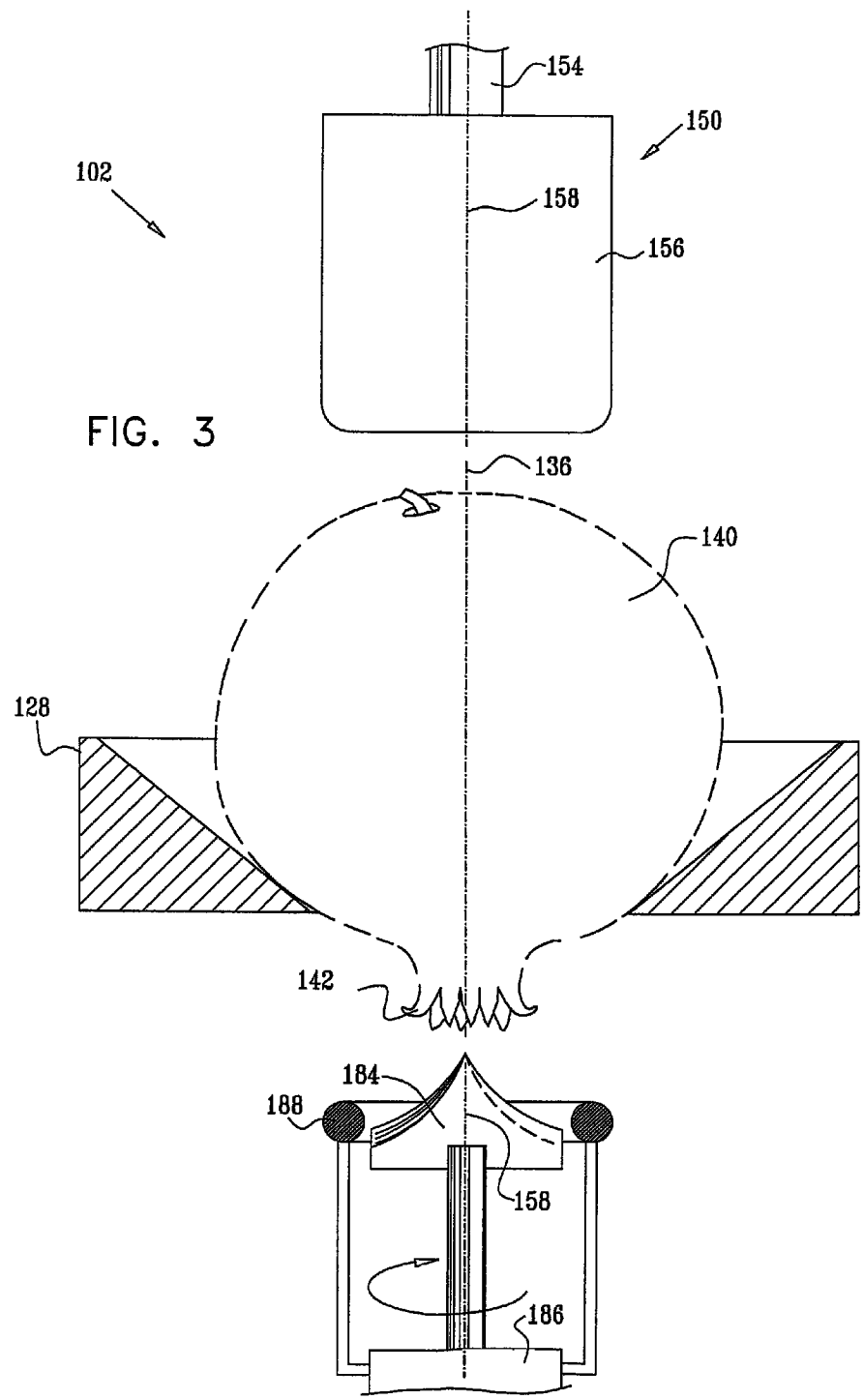
FIG. 3 is a partially cut away side view illustration of pomegranate crown removal apparatus, forming part of the apparatus of FIG. 1.

Reference is now made additionally to FIG. 3, which, together with FIG. 1, illustrates one embodiment of a crown removal assembly 102. Each crown removal assembly 102, of which preferably two are provided, preferably includes a pneumatically operated piston assembly 150, including a cylinder 152 (FIG. 1) and a rod 154, which terminates in a pomegranate retaining head 156. Assembly 150 provides vertical motion of retaining head 156 along a preferably vertical axis 158. Preferably pomegranate support sockets 128 are each aligned relative to a crown removal assembly 102, such that vertical axis 136 and vertical axis 158 are coaxial.

Disposed along axis 158 is a rotatable crown removing knife 184, which is arranged to be displaced vertically upward along axis 158 into operative engagement with the crown 142 of the pomegranate 140, which crown is preferably aligned with axis 136 and thus with axis 158. Knife 184 is driven in rotary motion by a motor (not shown) and is selectably displaced along axis 158 by a linear actuator 186, such as a pneumatic piston. A knife depth limiting ring 188 preferably surrounds knife 184, but does not rotate therewith. It is a particular feature of the present invention that knife 184 has a curved blade configuration which is adapted to the configuration of the crown 142 and to the configuration of a portion 190 (FIG. 4B) of the pomegranate rind which separates the crown 142 from the seeds 110, so as to leave portion 190 (FIG. 4B) intact.

Figure 4A:
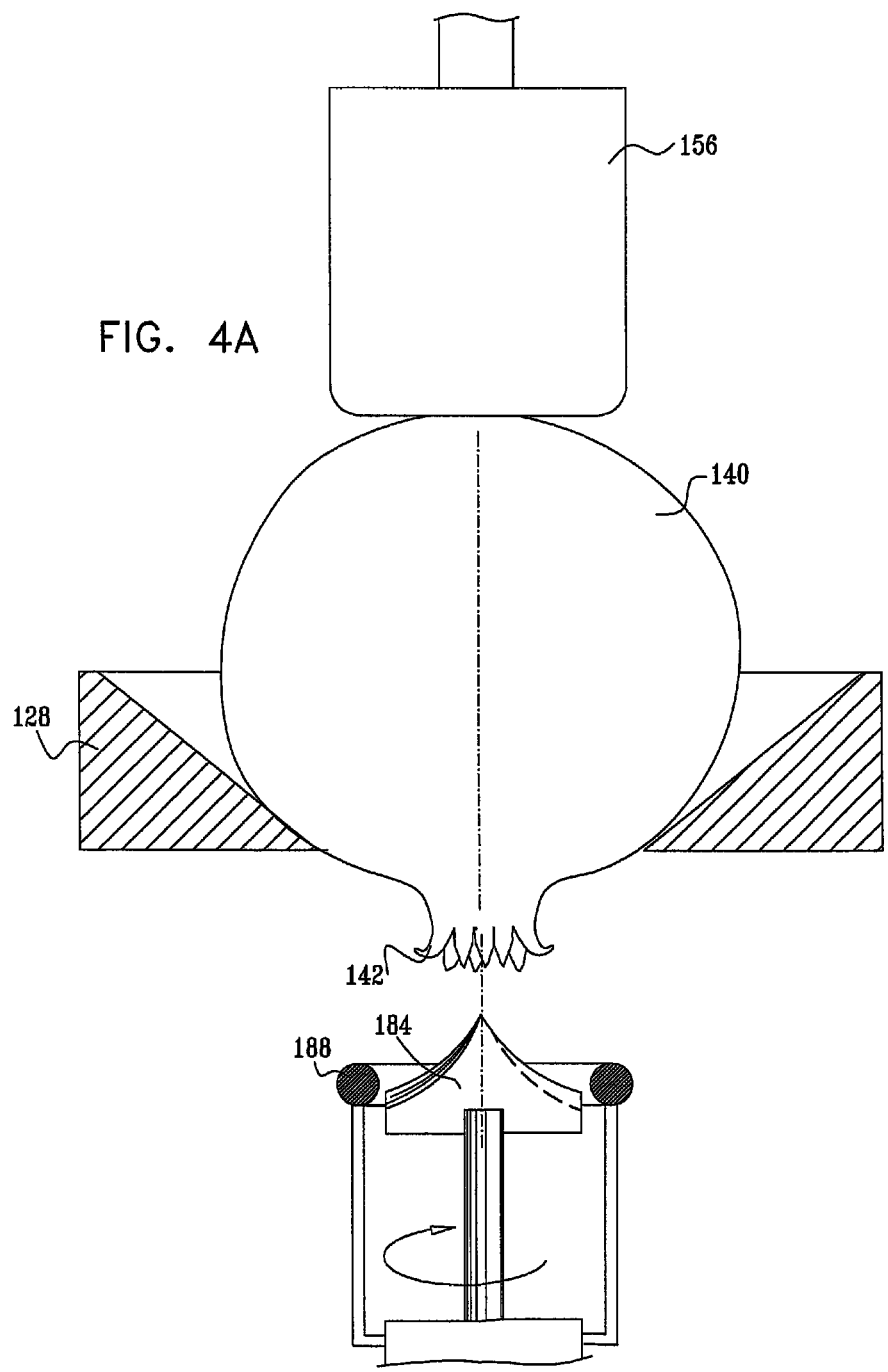

Reference is now made to FIGS. 4A, 4B, 4C and 4D, which are simplified side view illustrations of four steps in the operation of the apparatus of FIG. 3. As seen in FIG. 4A, retaining head 156 is lowered into operative engagement with a top surface of pomegranate 140, which is in turn supported on pomegranate support socket 128. If the pomegranate 140 is properly positioned in support socket 128, rotating knife 184 is aligned with the pomegranate crown 142.

Figure 4B:
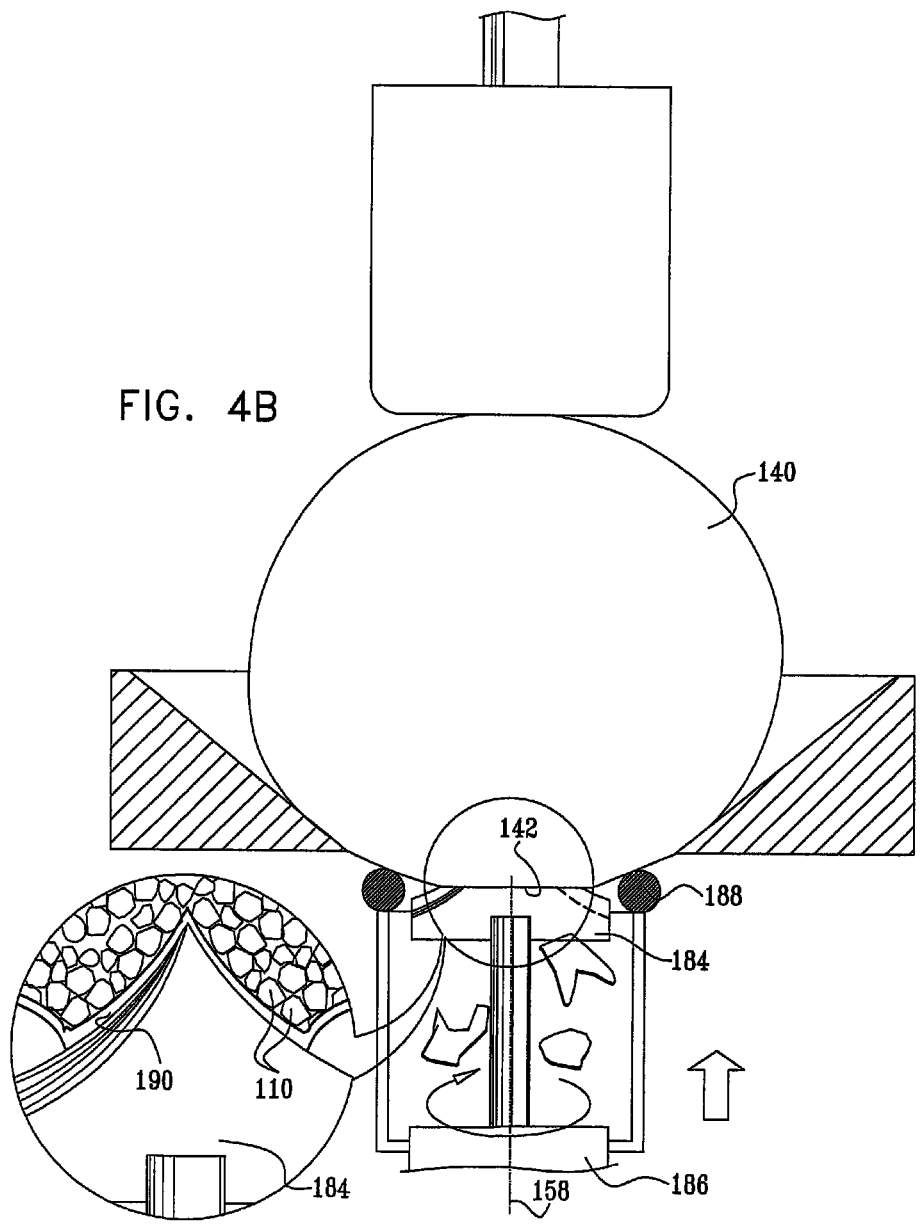

Turning to FIG. 4B, it is seen that knife 184 is moved upward along axis 158 into cutting engagement with crown 142, limited by engagement of ring 188 with the pomegranate 140, thus removing the crown but preferably not engaging or damaging the pomegranate seeds 110. It is appreciated that due to variations in the configuration of the fruit, in some cases, engagement of the knife 184 with the pomegranate seeds 110 will occur, although this is sought to be minimized or eliminated.

It is a particular feature of the present invention that knife 184 has a curved blade configuration which is adapted to the configuration of the crown 142 and to the configuration of a portion 190 of the pomegranate rind which separates the crown 142 from the seeds 110, so as to leave portion 190 intact.

Figure 4C:
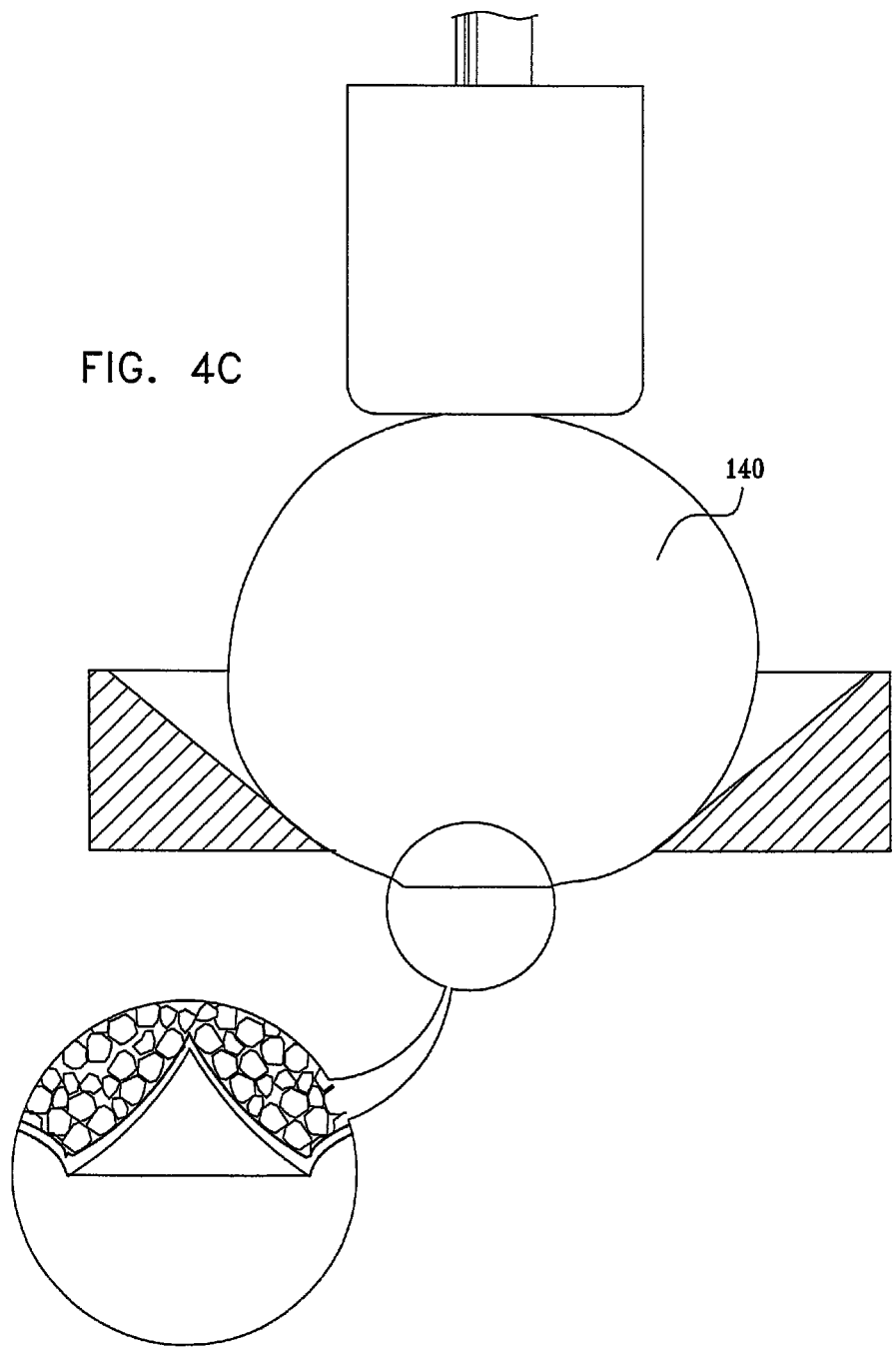

FIG. 4C illustrates pomegranate 140 followed preferred crown removal.

FIG. 4D illustrates disengagement of retaining head 156 from pomegranate 140, following removal of the crown 142.

At this stage, as shown in FIG. 1, endless conveyor 100 moves the pomegranates in a stepwise manner from the crown removal assemblies 102 to the break-open assemblies 104.

Figure 5:
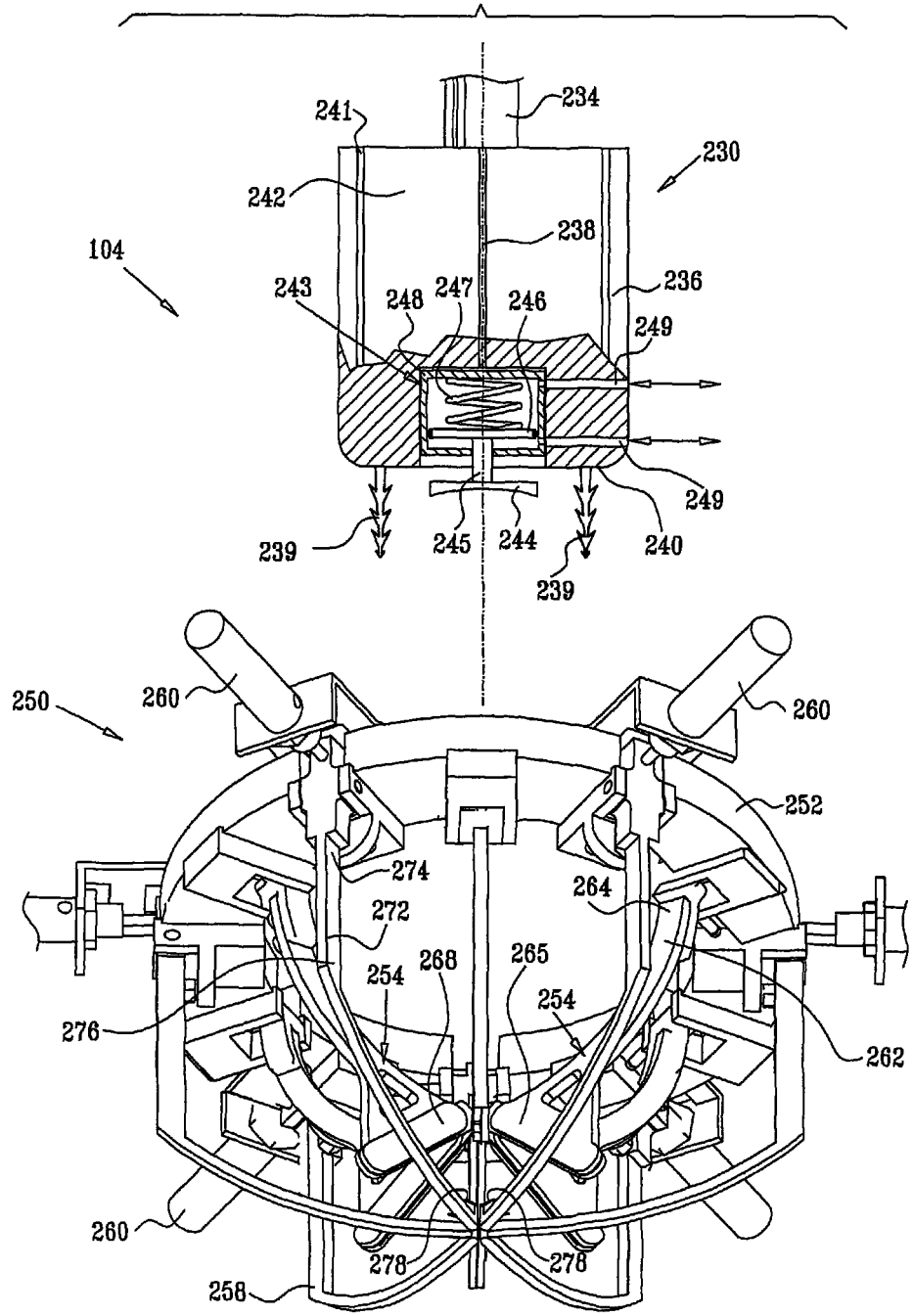
FIG. 5 is a simplified pictorial illustration of part of a pomegranate break-open assembly constructed and operative in accordance with a preferred embodiment of the present invention.

Reference is now made additionally to FIG. 5, which is a simplified illustration of a portion of pomegranate break-open assembly constructed and operative in accordance with a preferred embodiment of the present invention, and to FIGS. 6A, 6B, 6C, 6D, 6E, 6F, 6G, 6H & 6I and FIGS. 7A, 7B, 7C, 7D, 7E, 7F, 7G, 7H & 7I, which are simplified respective top view and side view illustrations of steps in the operation of the pomegranate break-open apparatus of FIG. 5. Pomegranate break-open assembly 104, of which preferably two are provided, preferably includes a pneumatically operated piston assembly 230, including a cylinder 232 (FIG. 1) and a rod 234, which terminates in a pomegranate positioning head 236. Assembly 230 provides vertical motion of positioning head 236 along a preferably vertical axis 238.

Pomegranate positioning head 236 preferably includes a plurality of barbed pomegranate engagement shafts 239 which extend parallel to axis 238 downwardly from a bottom surface 240 of head 236 and is provided with a plurality of evenly spaced vertically aligned slits 241 along an outer cylindrical surface 242 thereof.

Preferably disposed at bottom surface 240 of head 236 is a pusher assembly 243, which preferably is pneumatically operated for selectively disengaging the head 236 from the pomegranate 140. Pusher assembly 243 preferably comprises a pusher element 244, which is connected by a rod 245 to a piston 246. The piston 246 is biased forwardly by a spring 247 and is positioned along axis 238 relative to a surrounding cylinder 248 preferably by the relative pneumatic pressure supplied to conduits 249, communicating with respective interior volumes of the cylinder 248 lying on respective opposite sides of piston 246.

Alternatively, pusher assembly 243 may be replaced by a vacuum cup (not shown), which communicates with conduits 249.

Figure 6B:
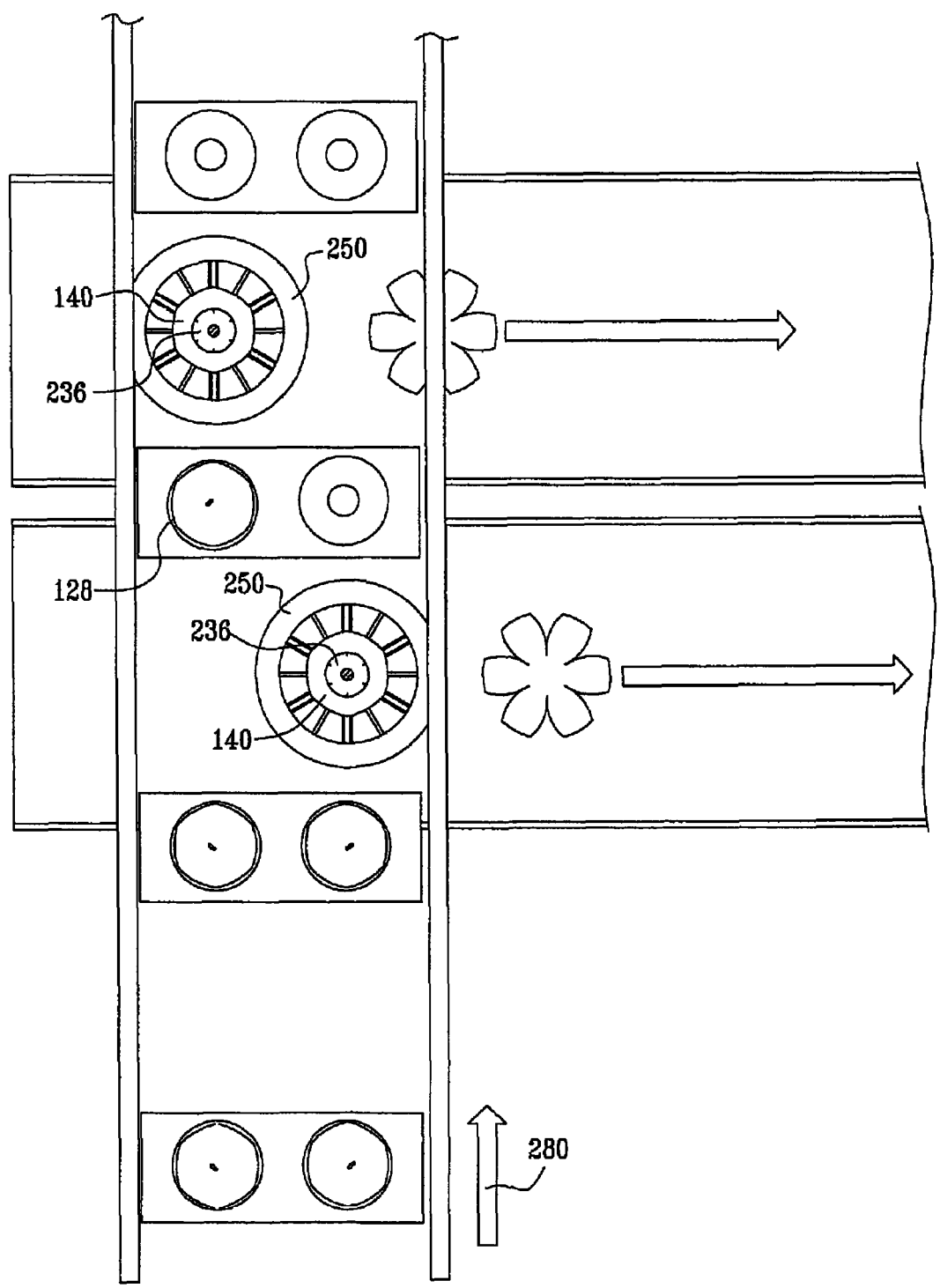

Preferably, a pomegranate support socket 128 is aligned along axis 238 for initial pickup of the pomegranate 140 from the socket 128, as seen in FIGS. 6A and 7A, wherein barbed pomegranate engagement shafts 239 engage and retain the pomegranate 140. Following pomegranate pick-up, the conveyor 100 (FIG. 1) shifts socket 128 in a stepwise manner so that the pomegranate can be lowered into operative engagement with a scoring and pulling assembly 250, as shown in FIGS. 6B and 7B and described further hereinbelow.

Scoring and pulling assembly 250 preferably comprises a ring-shaped base element 252, which is fixedly mounted onto the chassis of the apparatus. Pivotably mounted onto base element 252 there are provided a plurality of scoring knife assemblies 254, preferably six in number, which are spring loaded by a corresponding plurality of springs (not shown), which are mounted onto base element 252.

Also pivotably mounted onto base element 252 are a plurality of segment pulling assemblies 258, preferably six in number, interdigitated with scoring knife assemblies 254. Segment pulling assemblies 258 are actuated, as described hereinbelow, by a corresponding plurality of commonly controlled segment pulling assembly pneumatic actuators 260, which are fixedly mounted onto base element 252.

Scoring knife assemblies 254 preferably each include an integrally formed arm element 262 having a pivot end 264 at the top thereof and a knife clamping portion 265 at the bottom thereof. A knife 266 is clamped between the knife clamping portion 265 and a clamping element 268, so as to extend outwardly from the knife clamping portion 265 by a predetermined distance, equal to a maximum desired scoring depth at which scoring of a pomegranate is to be effected.

Segment pulling assemblies 258 preferably each include an integrally formed arm element 272 having a pivot end 274 at the top thereof, a bend 276 nearer to the top thereof than to the bottom thereof and an inwardly facing pointed hook 278 at the bottom thereof.

Figure 6C:
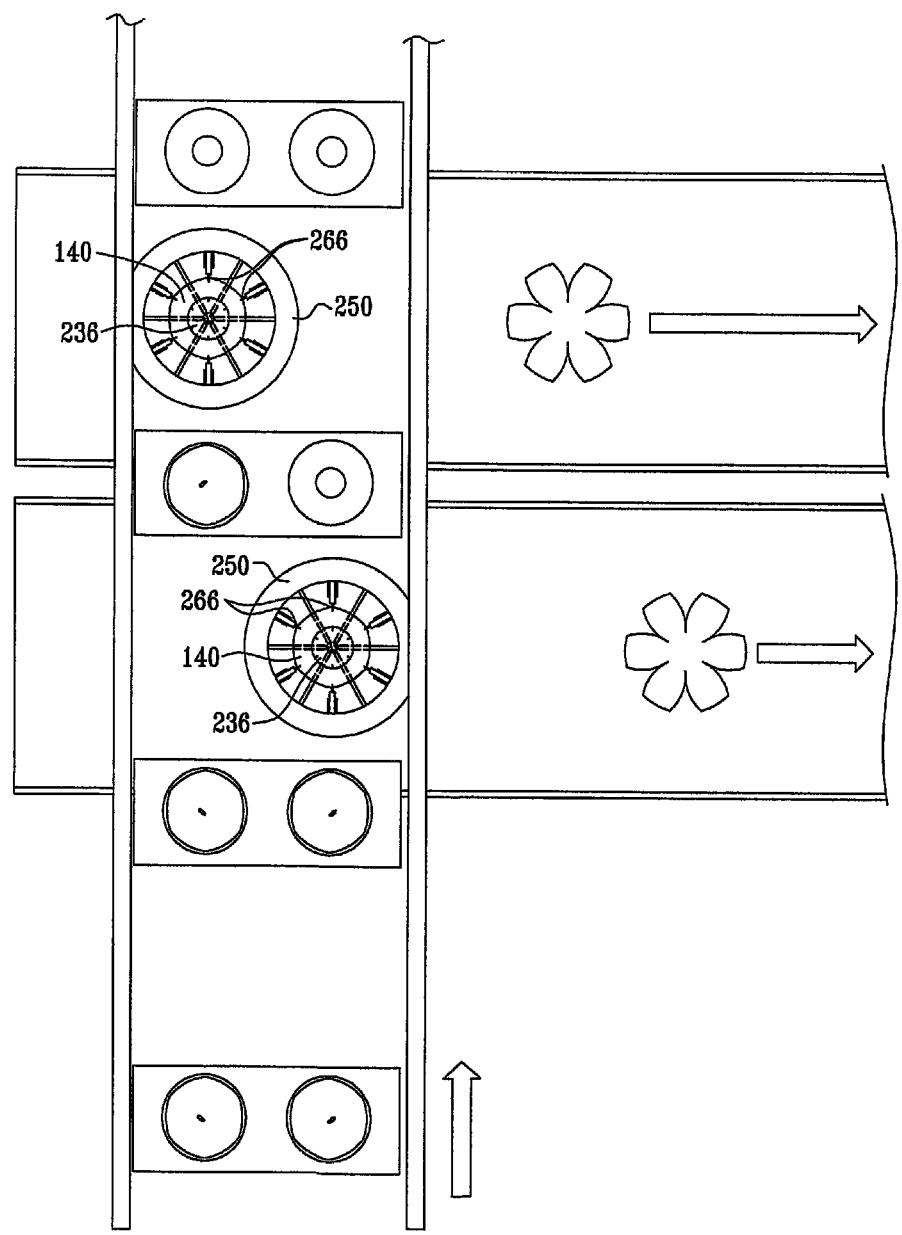
Figure 6D:
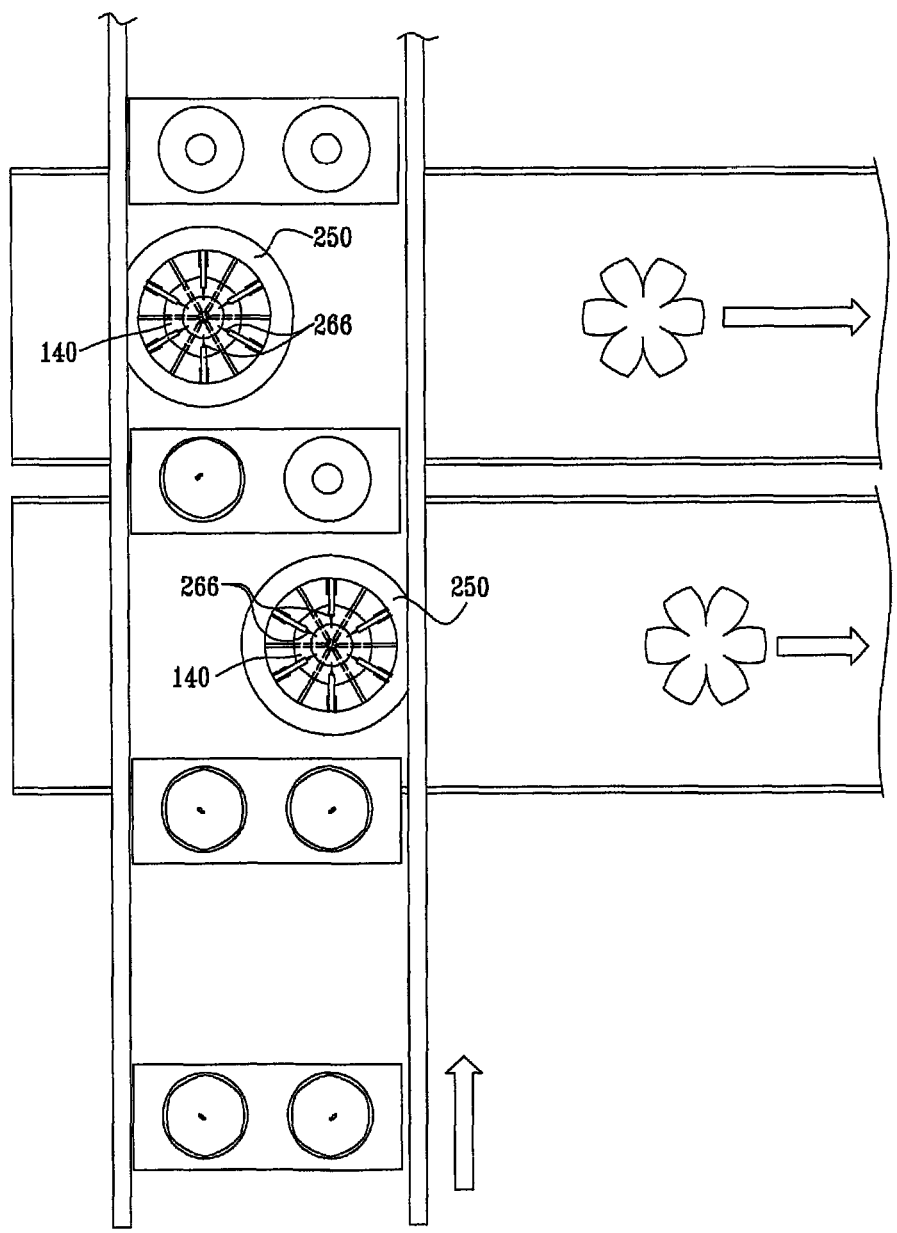
Figure 6E:
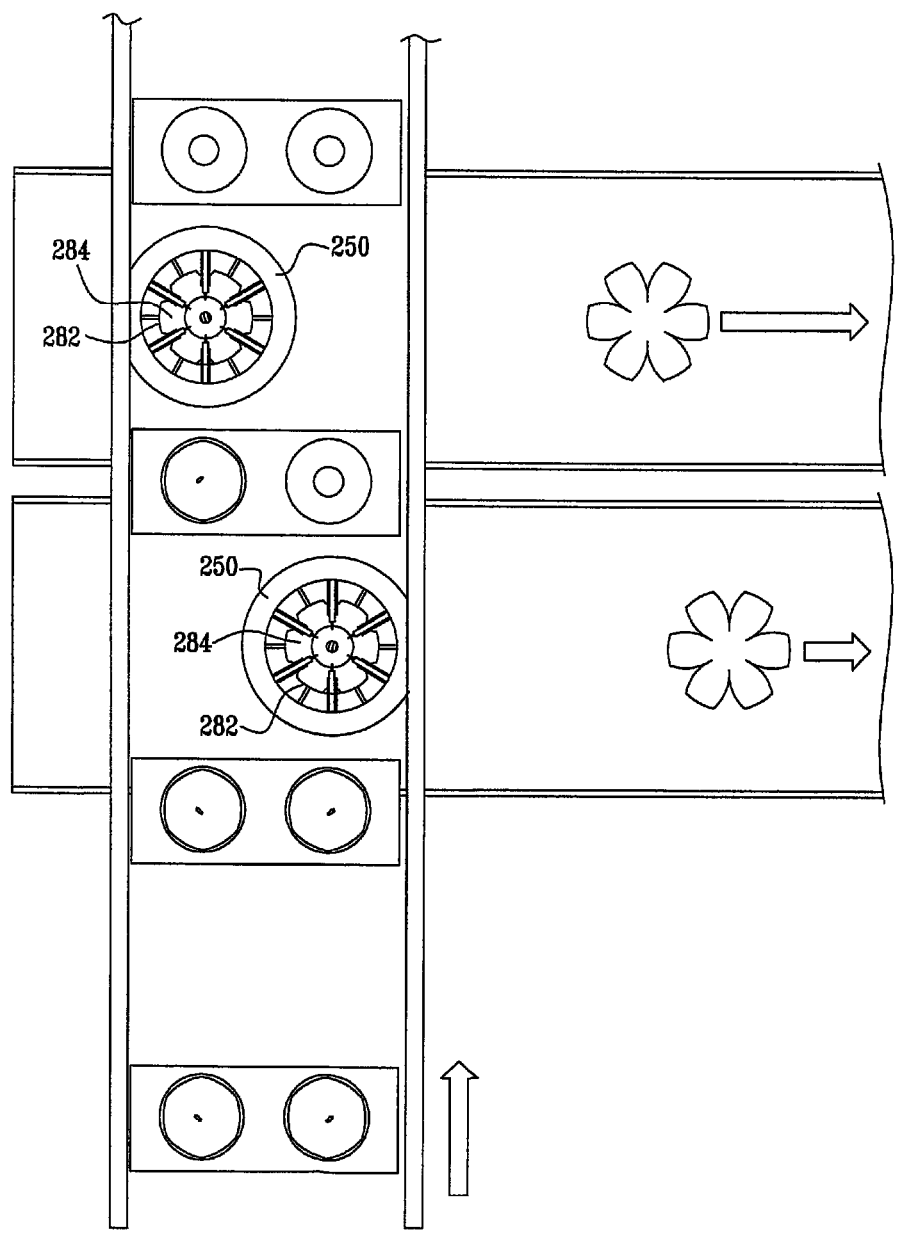
Figure 6F:
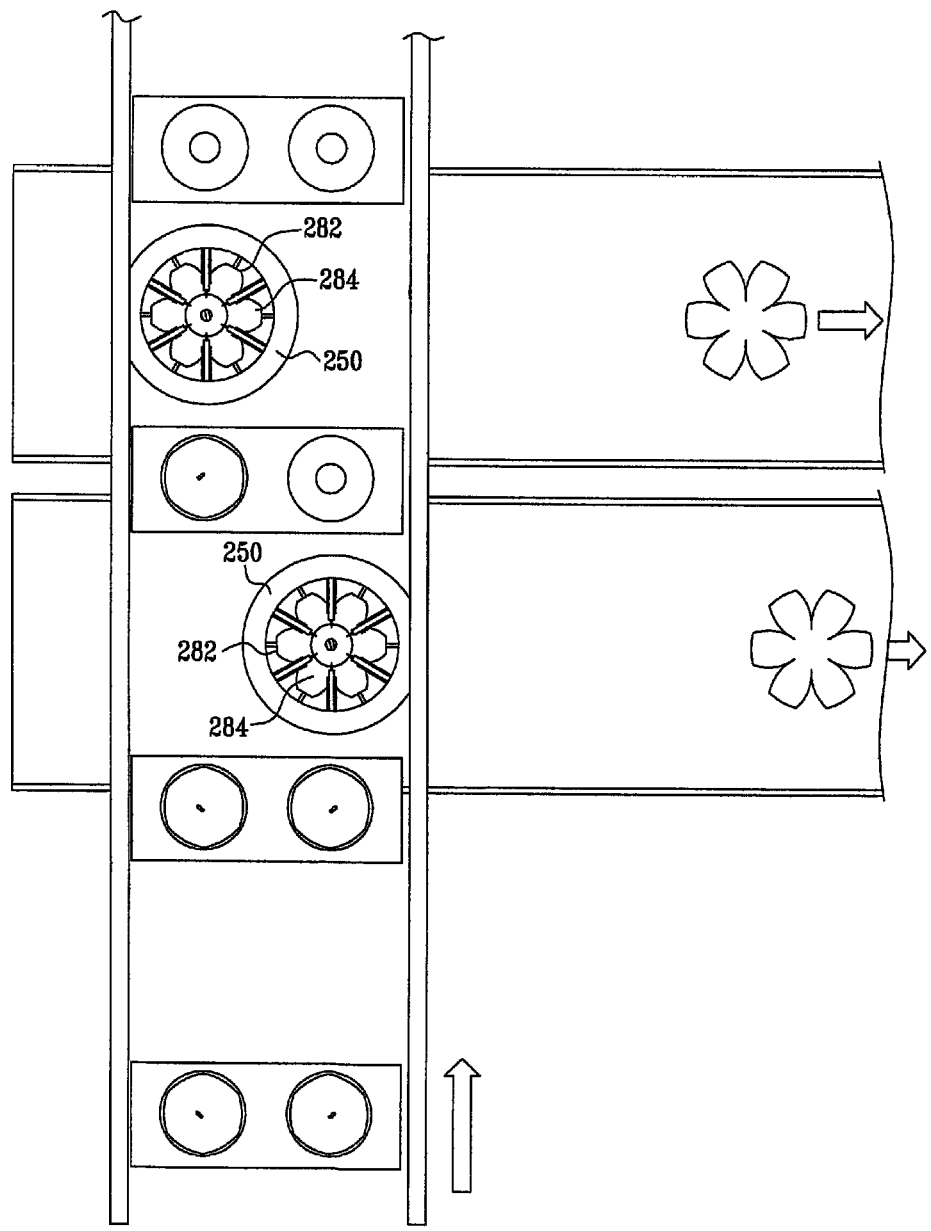
Figure 6G:
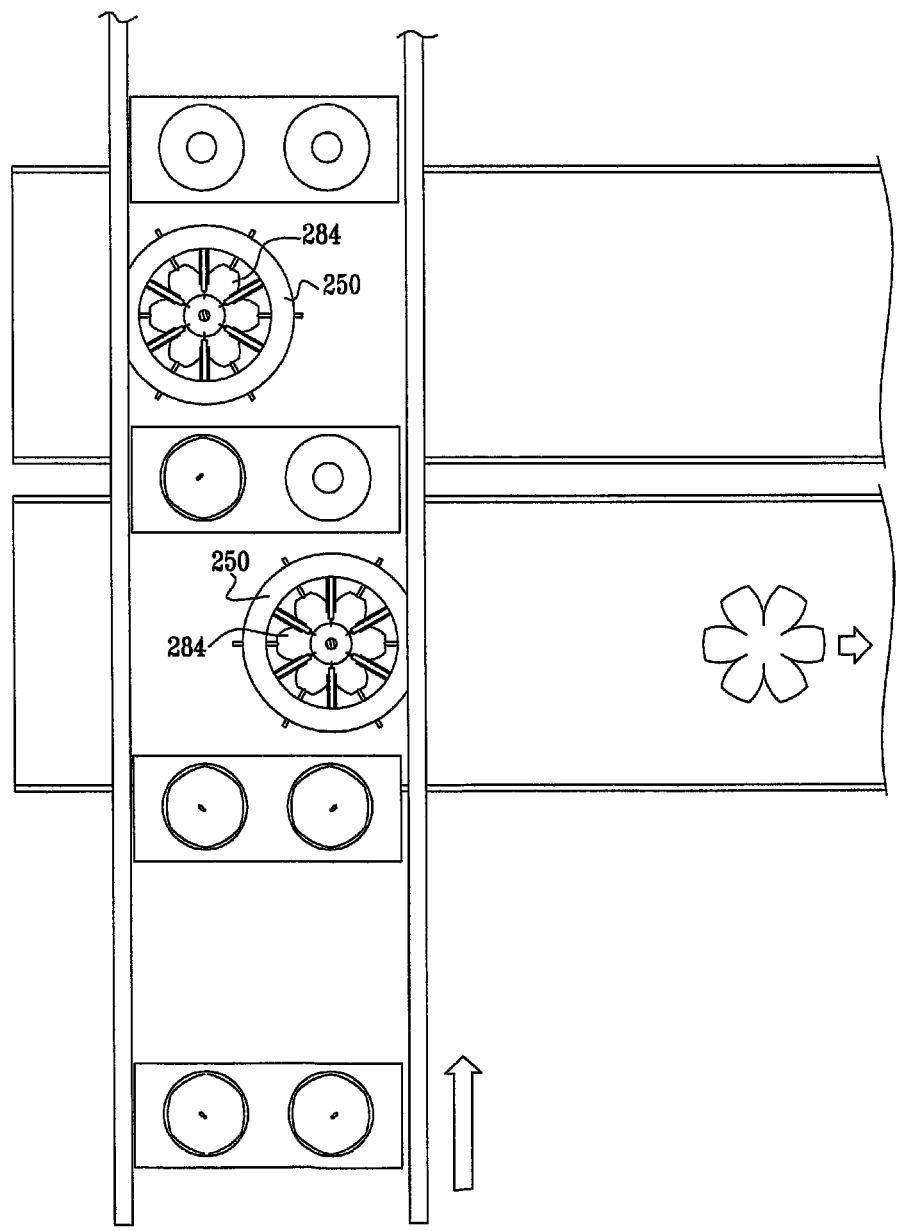
Figure 6H:
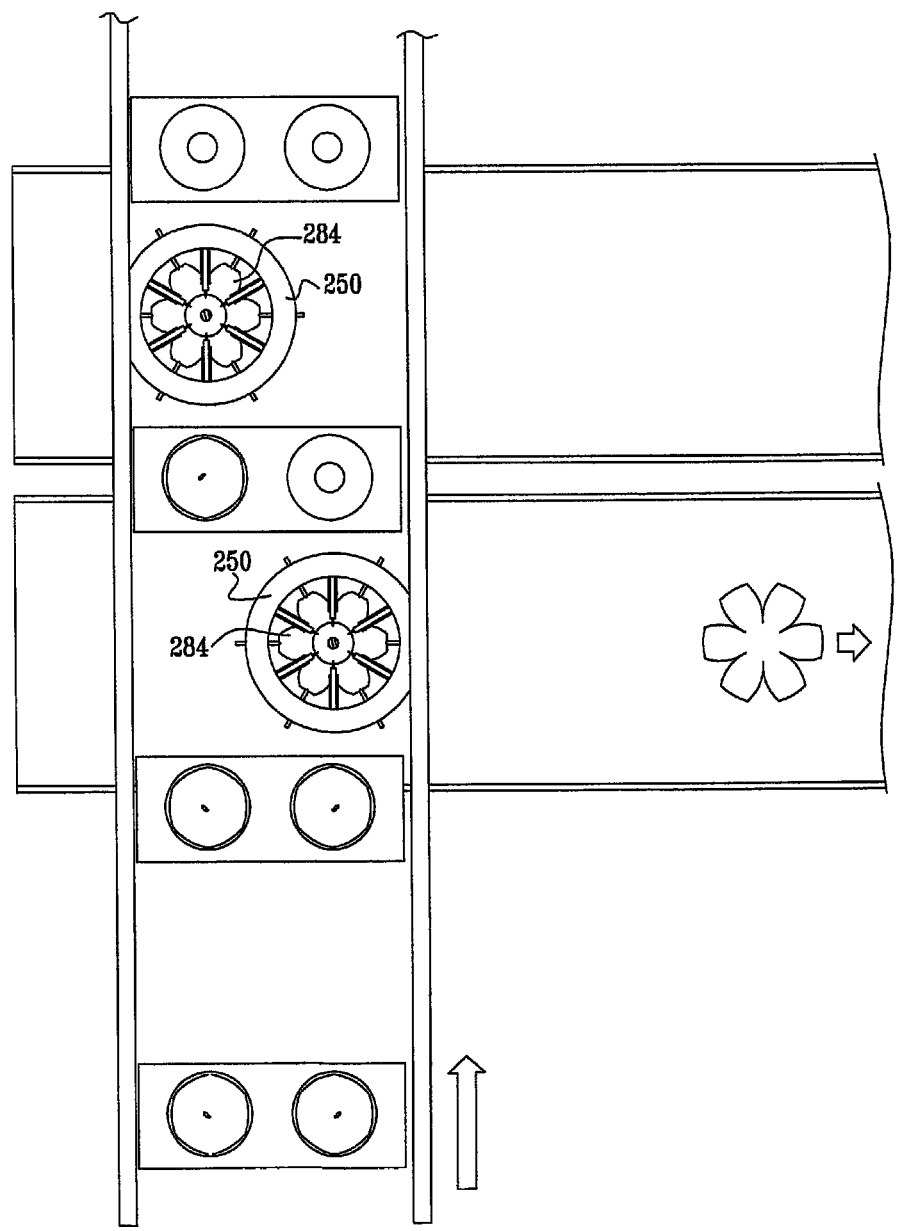
Figure 61:
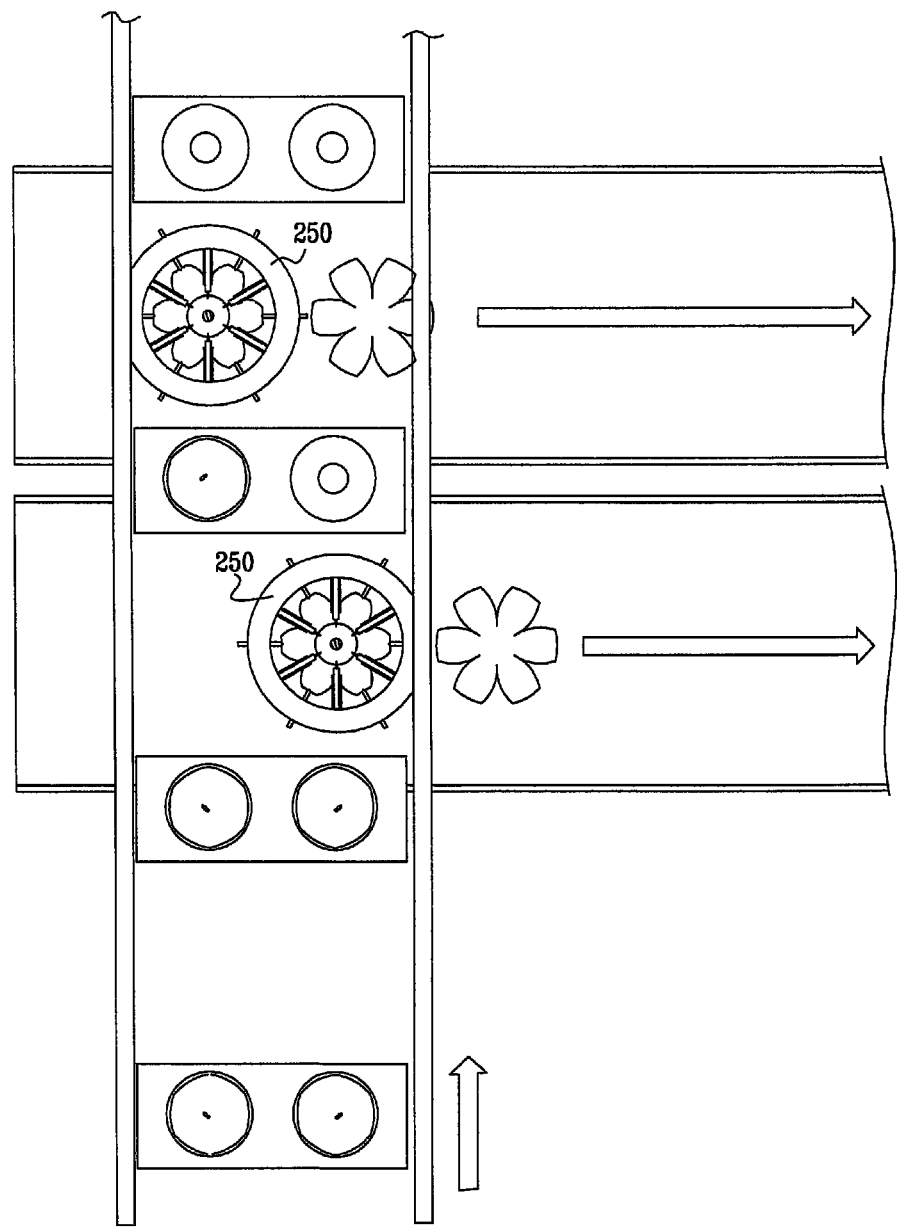
Figure 7C:
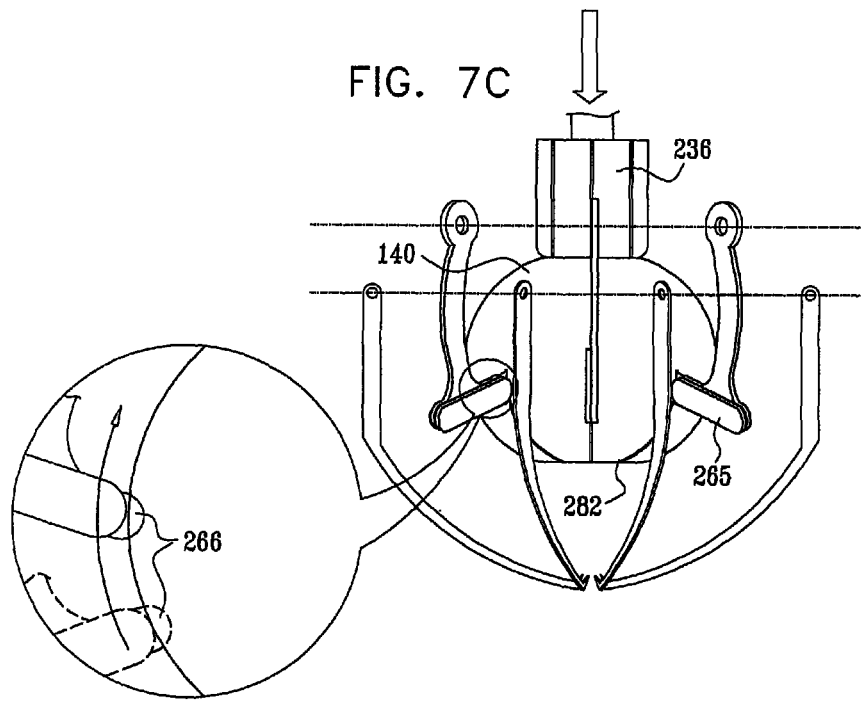

FIGS. 6A and 7A illustrate pomegranates 140 being held by pomegranate positioning heads 236 above respective scoring and pulling assemblies 250. At this stage, sockets 128 (not shown in FIG. 7A for the sake of clarity) are positioned intermediate the pomegranates 140 and the respective scoring and pulling assemblies 250. After the stage shown in FIGS. 6A and 7A, conveyor 100 (FIG. 1) is operated, preferably in a stepwise manner, to shift sockets 128 in a direction indicated by arrows 280 to positions illustrated in FIG. 6B. The steps which occur while pomegranate support sockets 128 are in the positions shown in FIG. 6B are now described with reference to FIGS. 6B-6I and 7B-7I.

FIGS. 6B and 7B illustrate initial engagement of pomegranates 140 with respective scoring and pulling assemblies 250, produced by downward movement of pomegranate positioning heads 236 resulting from actuation of piston assembly 230.

FIGS. 6C and 7C illustrate further downward movement of pomegranate positioning heads 236 relative to respective scoring and pulling assemblies 250, resulting in scoring engagement of knives 266 with the pomegranates 140. The scoring engagement preferably begins from the bottom of the pomegranate 140 at an edge 282 at which the crown was removed and proceeds upward along multiple, mutually and evenly spaced paths along the outer skin of the pomegranate 140. The depth of scoring is carefully limited by the extent by which each knife 266 protrudes from knife clamping portion 265, in order to prevent, in most cases, cutting of the pomegranate seeds 110.

Figure 7D:
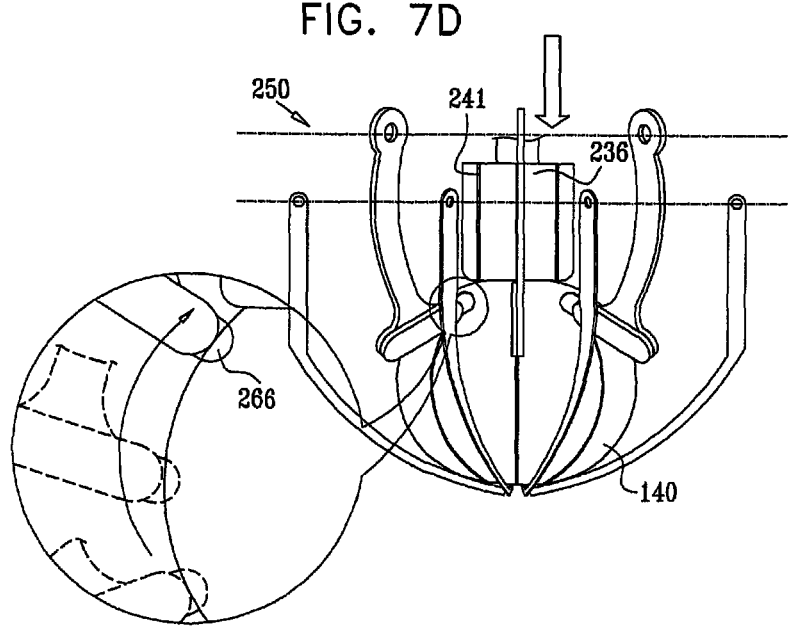

FIGS. 6D and 7D illustrate still further downward movement of pomegranate positioning heads 236 relative to respective scoring and pulling assemblies 250, resulting in continued scoring engagement of knives 266 with the pomegranate 140. The scoring engagement continues to a location near the top of the pomegranate 140 at which location the pomegranate is engaged by head 236 and the knives 266 engage respective slits 241 in head 236.

FIGS. 6E and 7E show additional downward movement of pomegranate positioning heads 236 relative to respective scoring and pulling assemblies 250, resulting in knives 266 moving along slits 241 in heads 236 and resulting in initial pulling apart of segments 284 of the pomegranates 140. Pulling apart is realized by engagement of hooks 278 with respective segments 284 of the pomegranate 140 at edge 282 thereof and by pivotal motion of arm elements 272 resulting from the downward movement of pomegranate positioning heads 236.

FIGS. 6F and 7F show still further downward movement of pomegranate positioning heads 236 relative to respective scoring and pulling assemblies 250, resulting in knives 266 moving further upward along slits 241 in heads 236 and resulting in further pulling apart of segments 284 of the pomegranates 140, producing breaking of membranes 116 (FIG.

1). This continued pulling apart is realized by pivotal motion of arm elements 272 resulting from the downward movement of pomegranate positioning heads 236 while hooks 278 are in engagement with respective segments 284 of the pomegranates 140 at edges 282 thereof.

Figure 7G:
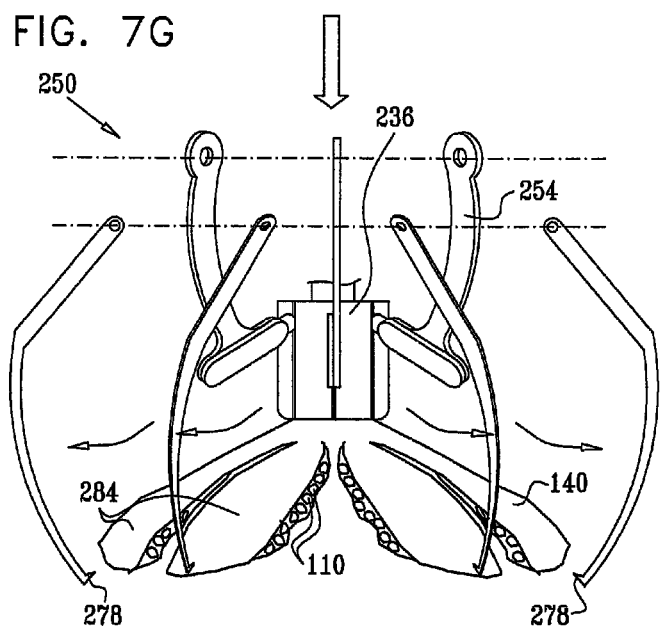

FIGS. 6G and 7G show still further downward movement of pomegranate positioning heads 236 relative to respective scoring and pulling assemblies 250, resulting in full breaking open of segments 284 of the pomegranates 140, producing further breaking of membranes 116 (FIG. 1) and very fully exposing the seeds 110. FIGS. 6G and 7G also illustrate disengagement of hooks 278 from respective segments 284 of the pomegranates 140, produced by the operation of actuators 260 (FIG. 5).

Figure 7H:
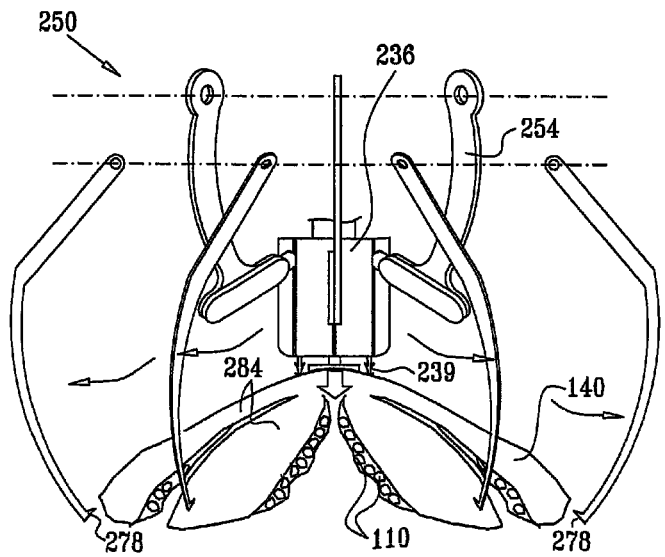
Figure 71:
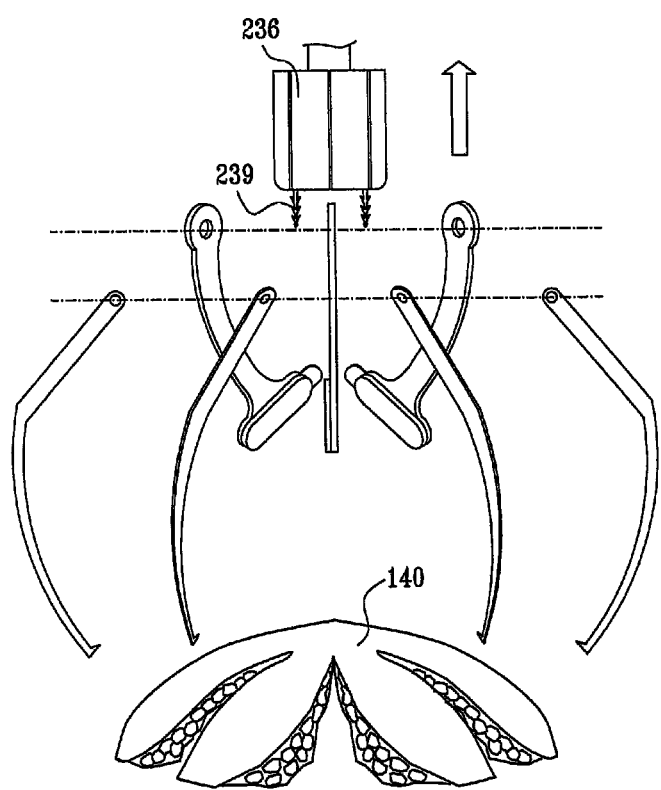

FIGS. 6H and 7H show initial operation of pusher assembly 243 (FIG. 5) which causes disengagement of the pomegranates 140 from the barbed pomegranate engagement shafts 239. Full disengagement is shown in FIGS. 6I and 7I.

Figure 8A:
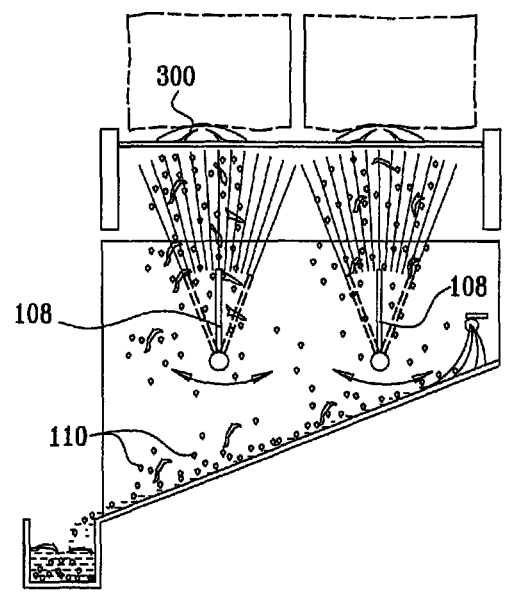
FIGS. 8A and 8B illustrate extraction of seeds from broken-open pomegranates using air jets in accordance with one embodiment of the present invention.
Figure 8B:
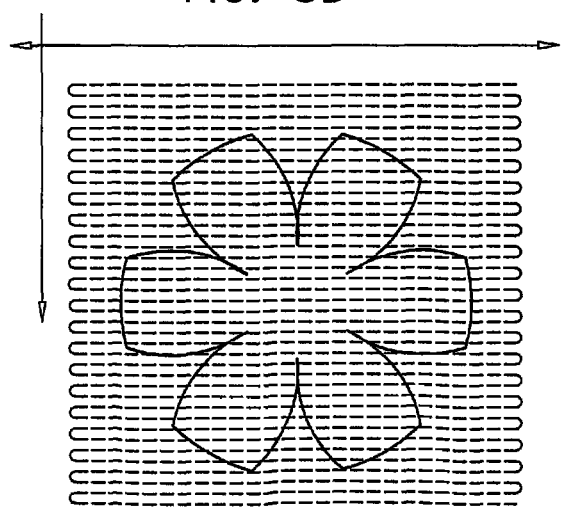

Reference is now made to FIGS. 8A and 8B, which illustrate extraction of seeds 110 from broken-open pomegranates 300 using air jets 108 in accordance with one embodiment of the present invention. In the illustrated embodiment of FIGS. 8A and 8B, air jets 108 each provide a jet of air which impinges on each broken-open pomegranate 300 preferably in a raster pattern, as illustrated in FIG. 8B.

Figure 9A:
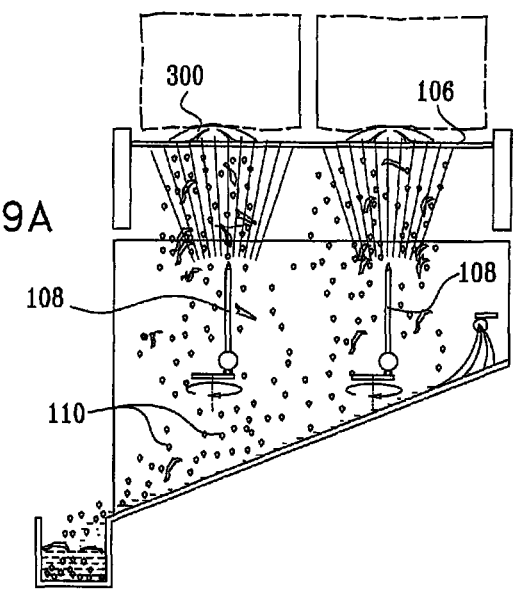
FIGS. 9A and 9B illustrate extraction of seeds from broken-open pomegranates using air jets in accordance with another embodiment of the present invention.
Figure 9B:
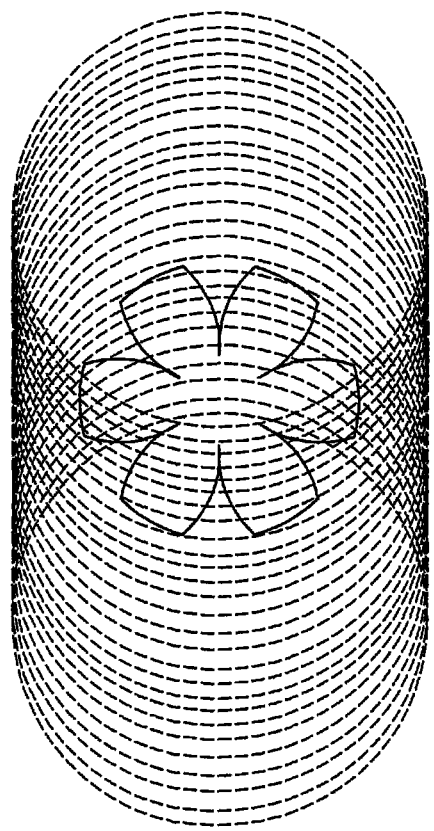

FIGS. 9A and 9B illustrate extraction of seeds 110 from broken-open pomegranates using air jets 108 in accordance with another embodiment of the present invention wherein air jets 108 each provide a jet of air which impinges on each broken-open pomegranate 300 in an overlapping spiral pattern, produced by combined rotational motion of the air jets 108 and perpendicular linear motion of the broken-open pomegranates 300 on conveyors 106.

Figure 10:
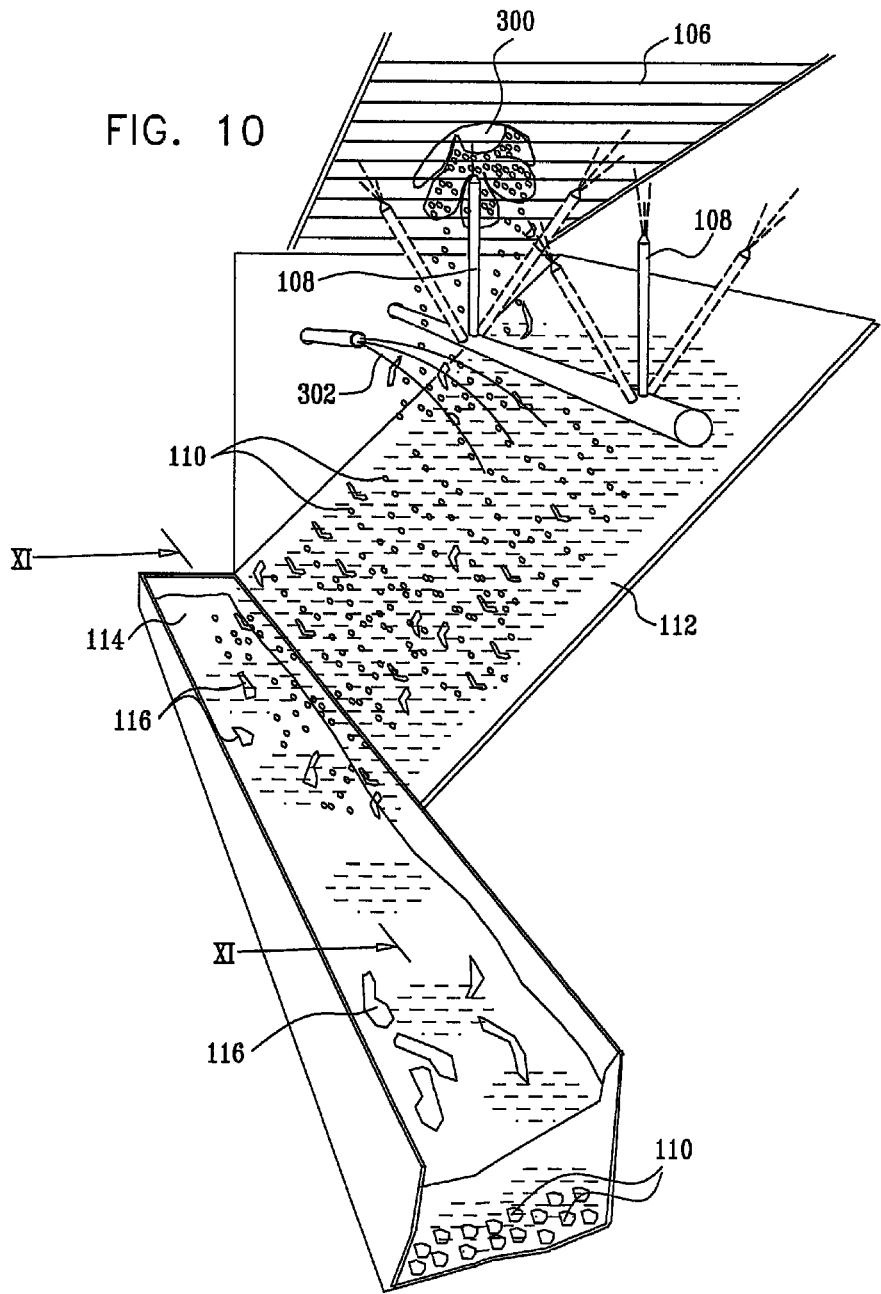
FIG. 10 is a pictorial illustration of transport and separation of individual pomegranate seeds in accordance with a preferred embodiment of the present invention.
Figure 11:
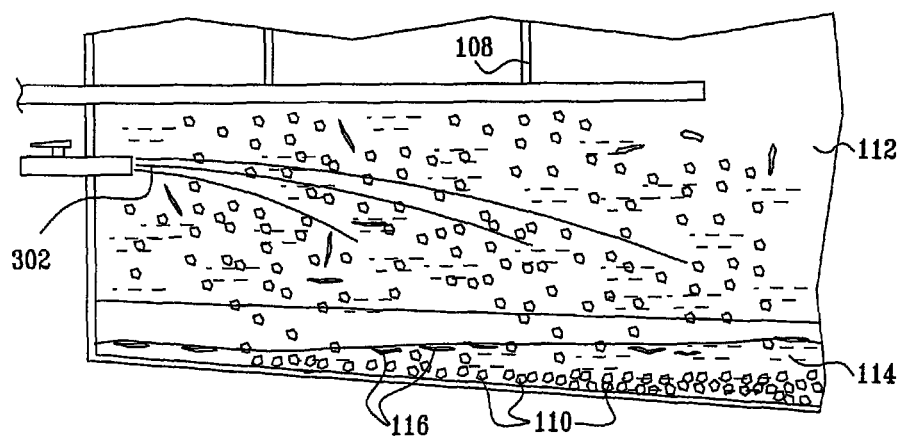
FIG. 11 is a sectional illustration taken along lines XI-XI in FIG. 10.

Reference is now additionally made to FIG. 10, which is a pictorial illustration of transport and separation of individual pomegranate seeds in accordance with a preferred embodiment of the present invention and to FIG. 11, which is a sectional illustration taken along lines XI-XI in FIG. 10. As seen in FIG. 10, air jets 108, arranged for operation in accordance with the embodiment of FIGS. 8A & 8B cause extraction of seeds 110 from broken-open pomegranates 300 on conveyors 106. As noted above with reference to FIG. 1, and shown in FIG. 11, the dislodged seeds 110 and broken pieces of membranes 116 are preferably engaged by a flow of water 302 and caused thereby to fall along an inclined surface 112 into a water flow trough 114 at which membranes 116 are separated from the seeds 110 by differences in their specific gravity, resulting in floating of the membranes 116, while the seeds 110 tend to sink in the trough 114.

Figure 12:
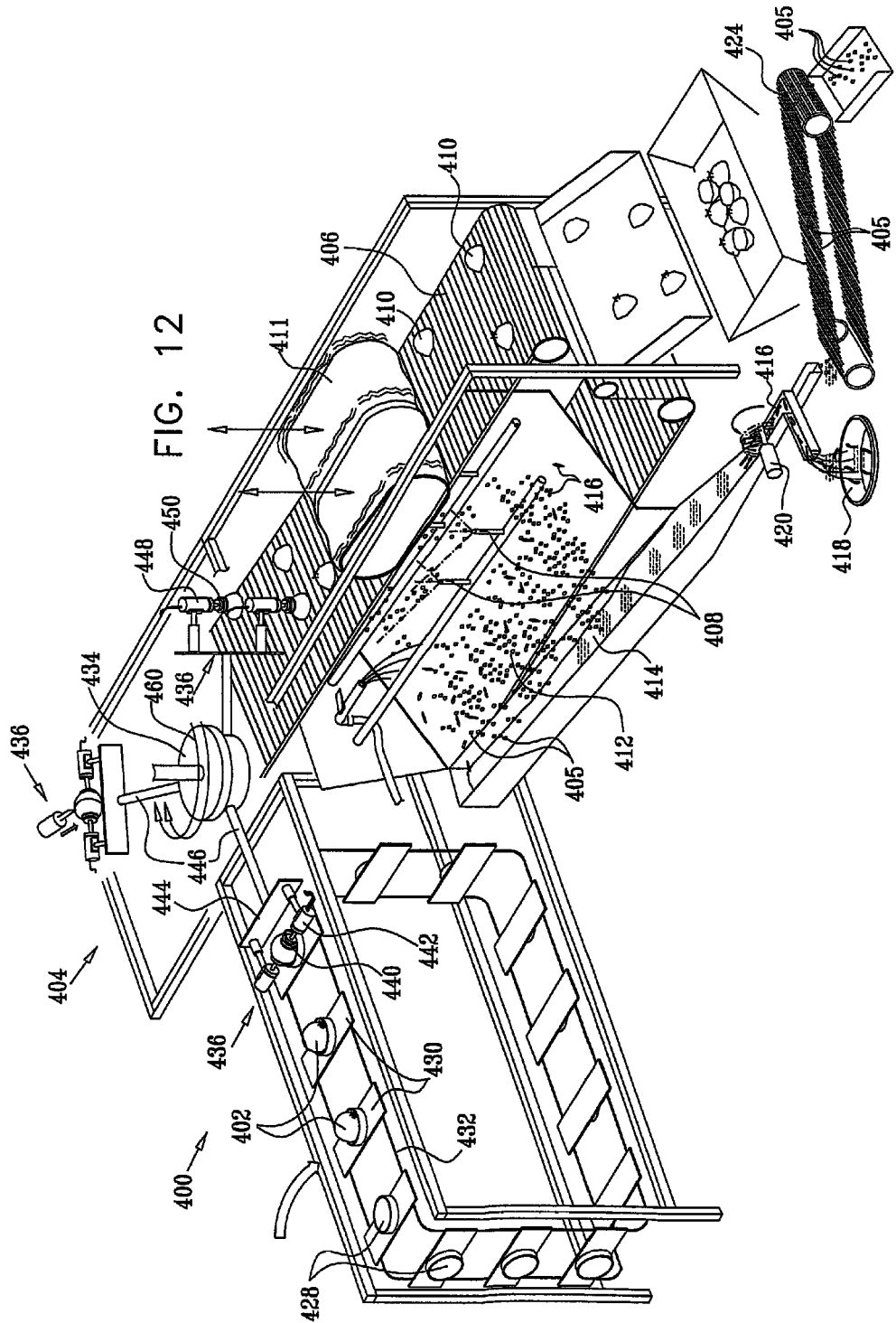
FIG. 12 is a simplified pictorial illustrations of apparatus for extraction of seeds of pomegranates, constructed and operative in accordance with another preferred embodiment of the present invention.

Reference is now made to FIG. 12, which is a simplified pictorial illustration of apparatus for extraction of seeds of pomegranates, constructed and operative in accordance with another preferred embodiment of the present invention.

The apparatus of FIG. 12 comprises an endless conveyor 400, driven by a motor (not shown) preferably in a stepwise manner, which is operative to receive and supply pomegranates 402 to pomegranate break-open assemblies 404, which break open the pomegranates 402 to expose their seeds 405 for extraction thereof, generally without cutting the seeds 405. Broken-open pomegranates are transported on a conveyor 406, preferably a rod, mesh or screen conveyor, into operative engagement with fluid jets, preferably air jets 408, which dislodge the seeds 405 from the remainder of the broken-open pomegranate 410. Preferably a retaining conveyor belt 411, which is preferably vibrating, engages the broken-open pomegranates from above, while they are engaged by the air jets 408 from below. The dislodged seeds 405 are preferably engaged by a flow of water and caused thereby to fall along an inclined surface 412 into a water flow trough 414 at which pomegranate membranes 416 are separated therefrom, by floating. The membranes 416 are deflected to a waste receptacle 418, some of the membranes being deflected by a rotating membrane deflector 420. The seeds 405 are preferably conveyed by an additional conveyor 424, preferably a screen conveyor, which permits water to drip therethrough, to a collection location (not shown).

Conveyor 400 preferably comprises pomegranate support sockets 428, which are mounted onto socket support surfaces 430. Socket support surfaces 430 are preferably interconnected by at least one conveyor belt 432, as shown. Pomegranates 402 are preferably positioned sidewise in sockets 428.

Pomegranate break-open assembly 404 provides for initially equatorially scoring the pomegranates 402 and then breaking apart the pomegranates by rotating the top and bottom of the pomegranates in opposite directions, thus breaking the membranes 416 and exposing the seeds 405. As seen in FIG. 12, the pomegranate break-open assembly 404 comprises a plurality of pomegranate engagement subassemblies 436, which are preferably mounted on a rotating support 438.

Each of the pomegranate engagement subassemblies 436 includes a pair of motor driven pomegranate rotators 440, which are mounted for linear motion on linear actuators 442, which are in turn rotatably mounted onto a base 444. Base 444 is in turn mounted, typically via a shaft 446 onto rotating support 438. Each of the pomegranate rotators 440 includes a drive shaft 448 to which is coupled a vacuum cup 450 or other engagement assembly for tightly engaging either the top or the bottom of a pomegranate 402.

Reference is now additionally made to FIGS. 13A-13F, which illustrate operation of a pomegranate engagement subassembly 436 of the break-open assembly 404. FIG. 13A shows the subassembly 436 prior to engagement with a pomegranate 402, with linear actuators 442 being operative to bring vacuum cups 450 into tight engagement with the pomegranate 402. Following rotation of rotating support 438, as indicated by arrows 460 in FIG. 12, the subassembly 436 in engagement with a pomegranate 402 is positioned for scoring.

FIGS. 13B and 13C shows rotators 440 both operating in the same direction prior to and during scoring engagement of the pomegranate 402 with a knife 452, preferably mounted onto a linear actuator 454. As described hereinabove, care is taken such that scoring causes minimal or no cutting damage to the pomegranate seeds 405. FIG. 13D shows breaking open of the pomegranate 402 by rotating its equatorially scored portions in opposite directions by action of pomegranate rotators 440 and linear motion of linear actuators 442 in mutually opposite directions as indicated by arrows 456.

FIG. 13E shows a typical broken-open pomegranate 410, its equatorially scored portions being separated and each still being engaged by a vacuum cup 450. It is seen that membranes 416 are broken and seeds 405 are exposed. At this stage, linear actuators 442 are preferably rotated with respect to base 444, as indicated by arrows 458. This, combined with rotation of rotating support 438 as indicated by arrows 460 in FIG. 12, positions the broken open portions of the pomegranate face down onto conveyor 406, as shown in FIG. 13F, at which position they are released by vacuum cups 450.

It will be appreciated by persons skilled in the art that the present invention is not limited by what has been particularly shown and described hereinabove. Rather the scope of the present invention includes both combinations and subcombinations of the various embodiments described hereinabove as well as modifications thereto which would occur to a person skilled in the art reading the foregoing description and which are not in the prior art.

The invention claimed is:

1. Apparatus for extracting pomegranate seeds from pomegranates comprising:
   a pomegranate breaker operative for breaking open pomegranates generally without cutting pomegranate seeds, said pomegranate breaker comprising a plurality of hooks which engage segments of said pomegranates following partial separation of said segments from each other by scoring; and
   a pomegranate seed extractor operative to engage broken-open pomegranates for separating said pomegranate seeds from other parts of said pomegranates, said pomegranate seed extractor including a pomegranate seed/pomegranate membrane separator.

2. Apparatus for extracting pomegranate seeds from pomegranates according to claim 1 and wherein said pomegranate breaker comprises a pomegranate periphery scorer for scoring an outside rind of said pomegranates.

3. Apparatus for extracting pomegranate seeds from pomegranates according to claim 1 and wherein said pomegranate breaker comprises a pomegranate crown remover.

4. Apparatus according to claim 3 and wherein said crown remover includes a rotating knife having a curved cutting edge configured to enable removal of the crown generally without cutting pomegranate seeds.

5. Apparatus for extracting pomegranate seeds from pomegranates according to claim 1 and wherein said pomegranate breaker comprises an automatic pomegranate positioning assembly operative automatically to position said pomegranate at multiple operative positions during pomegranate breaking.

6. Apparatus for extracting pomegranate seeds from pomegranates according to claim 1 and wherein said pomegranate breaker comprises a scoring knife having a cutting depth limiter associated therewith.

7. Apparatus for extracting pomegranate seeds from pomegranates according to claim 1 and wherein said pomegranate seed extractor comprises a plurality of fluid jets.

8. Apparatus for extracting pomegranate seeds from pomegranates according to claim 7 and wherein said fluid jets impinge upon said broken-open pomegranates while said broken-open pomegranates are in motion.

9. Apparatus for extracting pomegranate seeds from pomegranates according to claim 1 and wherein said pomegranate seed/pomegranate membrane separator comprises:
   an inclined surface; and
   a water trough.

* * * * *